United States Patent [19]
Lussier et al.

[11] Patent Number: 6,035,502
[45] Date of Patent: Mar. 14, 2000

[54] APPARATUS FOR MANUFACTURING A HOUSING FOR A PERFORATING GUN

[75] Inventors: Norman Gerald Lussier; Michael Norman Lussier, both of Calgary, Canada

[73] Assignee: Prime Perforating Systems Limited, Calgary, Canada

[21] Appl. No.: 09/100,777

[22] Filed: Jun. 9, 1998

[51] Int. Cl.[7] .............................. B23P 23/06; B23Q 3/06
[52] U.S. Cl. ............................ 29/33 T; 29/33 D; 414/16
[58] Field of Search ................................. 414/14, 15, 16, 414/18; 409/219, 225, 163, 164, 174, 158, 159, 161; 269/56; 29/33 D, 33 T

[56] References Cited

U.S. PATENT DOCUMENTS

| | | | |
|---|---|---|---|
| 3,447,694 | 6/1969 | Hartle | 414/15 |
| 3,650,412 | 3/1972 | Neary | 414/18 |
| 3,650,414 | 3/1972 | Asada et al. | 414/18 |
| 3,700,222 | 10/1972 | Baxter et al. | 269/56 |
| 3,913,751 | 10/1975 | Friedman | 414/15 |
| 4,417,491 | 11/1983 | Uehara et al. | 414/18 |
| 4,626,148 | 12/1986 | Pringle | 409/157 |
| 4,634,323 | 1/1987 | Wagner et al. | 409/225 |
| 4,709,603 | 12/1987 | Buck | 414/14 |
| 5,005,274 | 4/1991 | Timell | 29/33 T |
| 5,088,181 | 2/1992 | Jeppsson | 409/219 |
| 5,161,289 | 11/1992 | Adams et al. | 29/33 T |
| 5,163,793 | 11/1992 | Martinez | 409/205 |
| 5,366,334 | 11/1994 | Cucchi | 414/15 |
| 5,525,017 | 6/1996 | Asada | 409/219 |
| 5,647,706 | 7/1997 | Lehmler et al. | 409/197 |
| 5,709,511 | 1/1998 | Esmailzadeh | 409/199 |
| 5,752,312 | 5/1998 | Harman et al. | 29/33 T |
| 5,819,384 | 10/1998 | Bruhl et al. | 29/33 D |
| 5,857,251 | 1/1999 | Schwarzenberger | 409/158 |
| 5,884,379 | 3/1999 | Lombardi | 29/33 D |

FOREIGN PATENT DOCUMENTS

| | | | |
|---|---|---|---|
| 4014616 | 11/1991 | Germany | 409/219 |
| 93022092 | 11/1993 | WIPO | 409/219 |

*Primary Examiner*—William Briggs
*Attorney, Agent, or Firm*—John C. Hunt

[57] ABSTRACT

An apparatus for manufacturing a machined article from an elongated tubular workpiece is disclosed. A machining device is movable within a work area of the apparatus and a movable base having first and second spaced apart clamps secure a section of the article. A stationary third clamp is mounted independent of the movable base for holding the article in a stationary position relative to the movable base. A conveyor permits positioning of the article relative to the clamps.

7 Claims, 18 Drawing Sheets

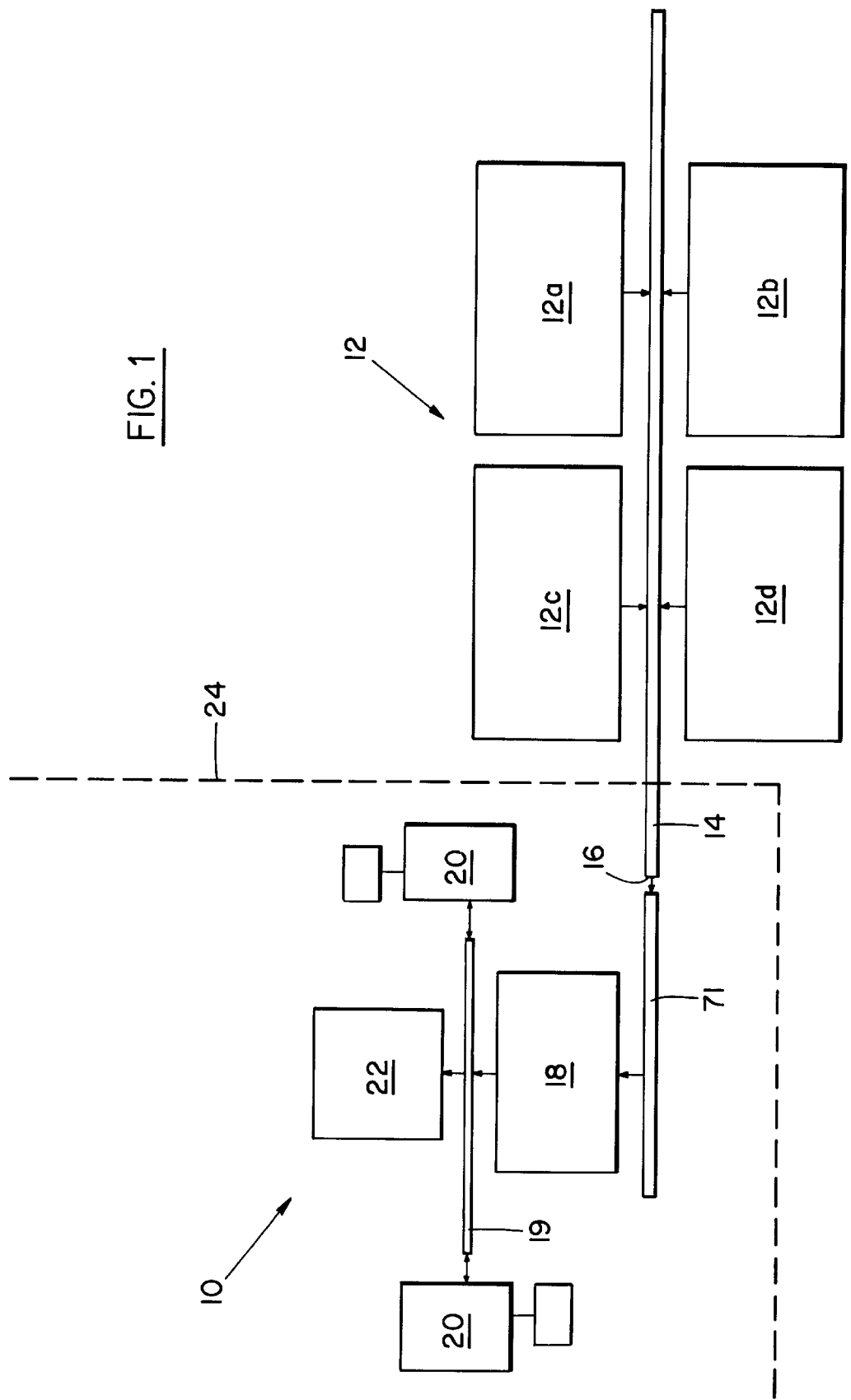

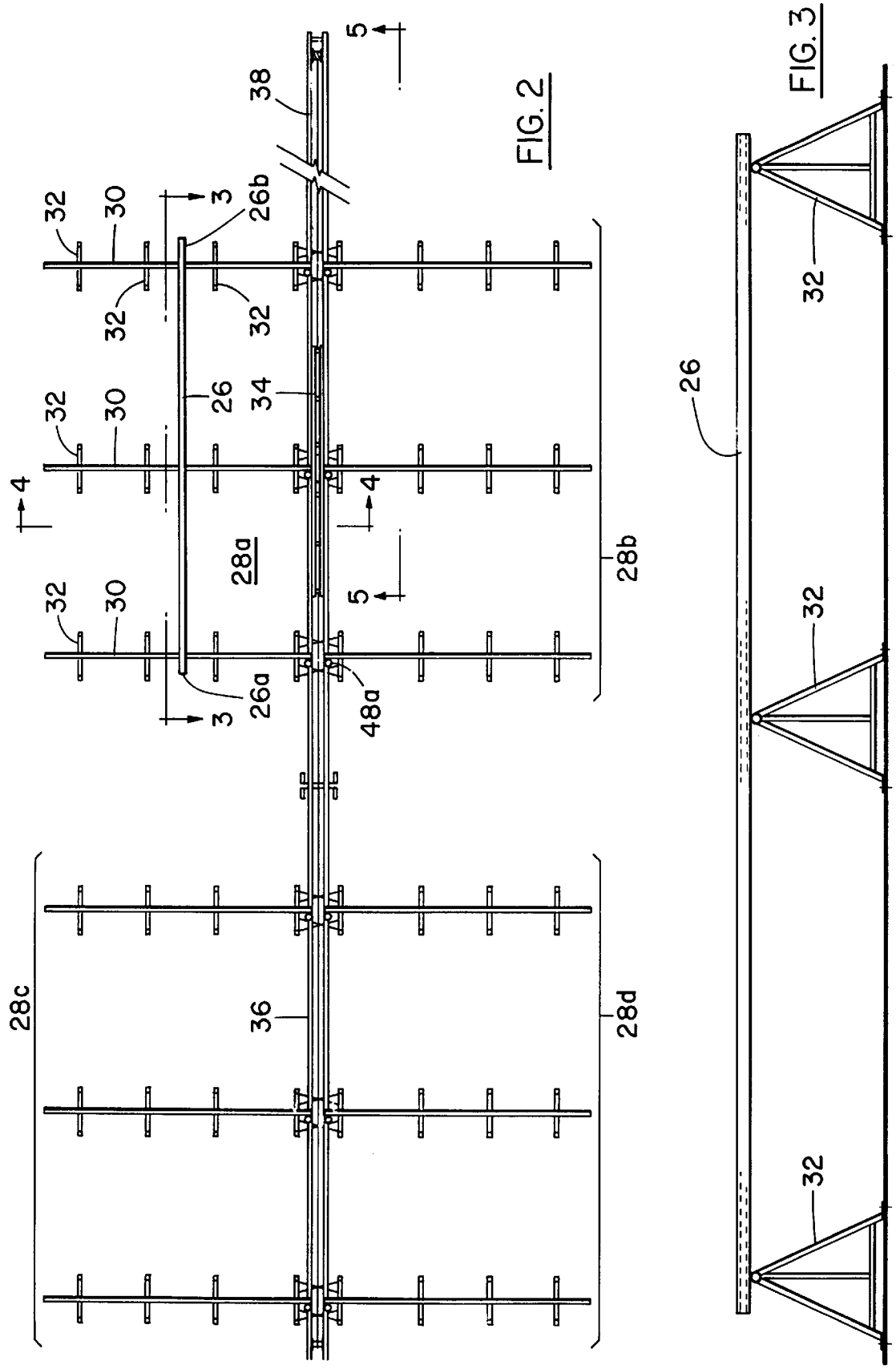

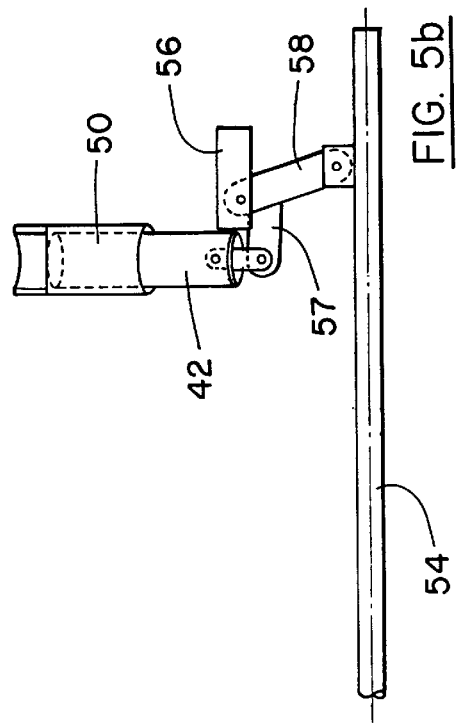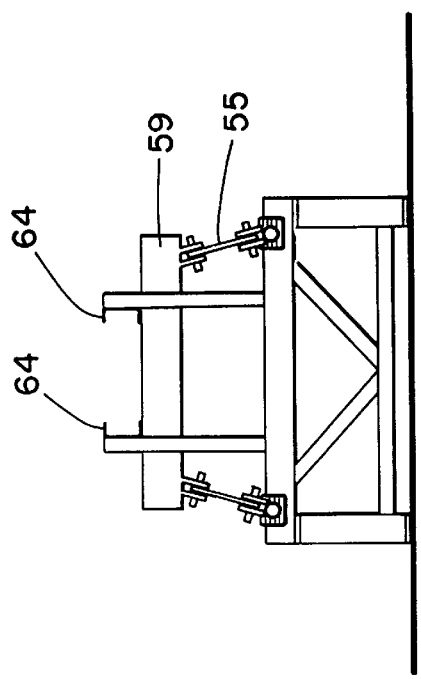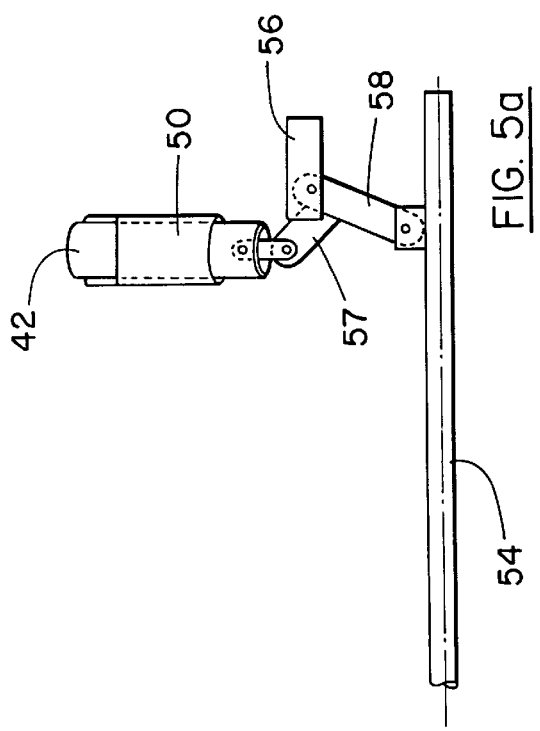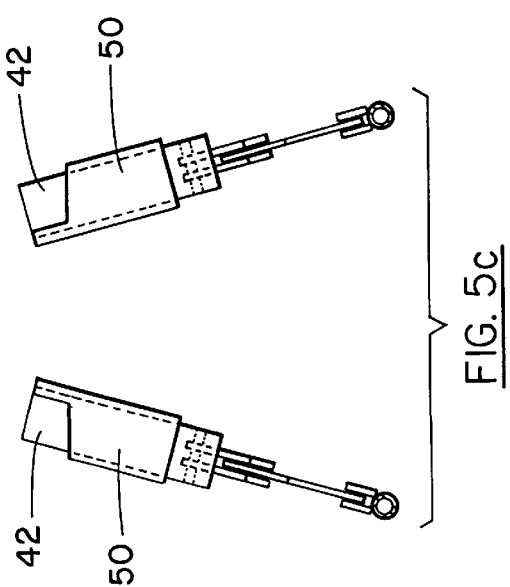

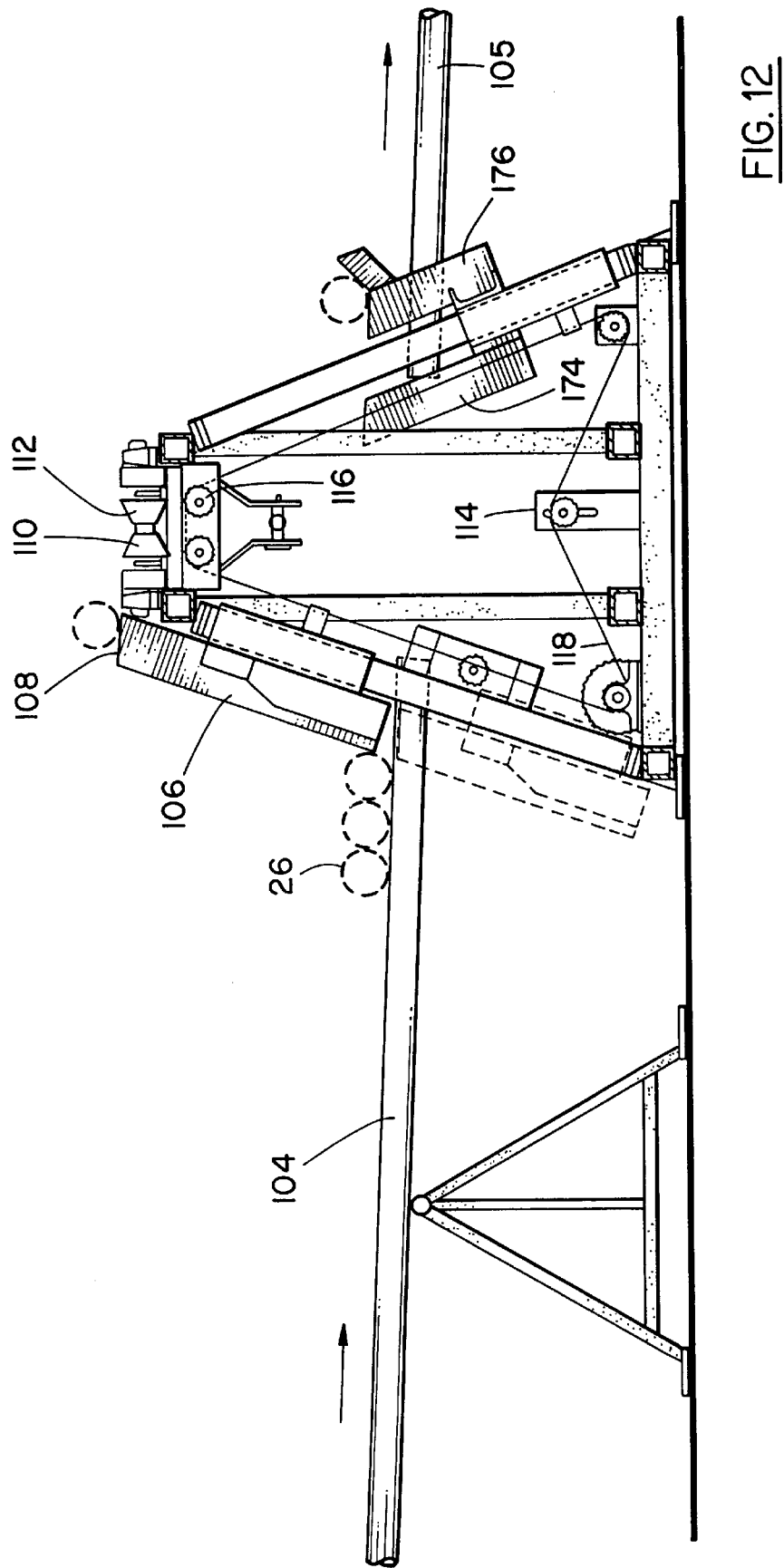

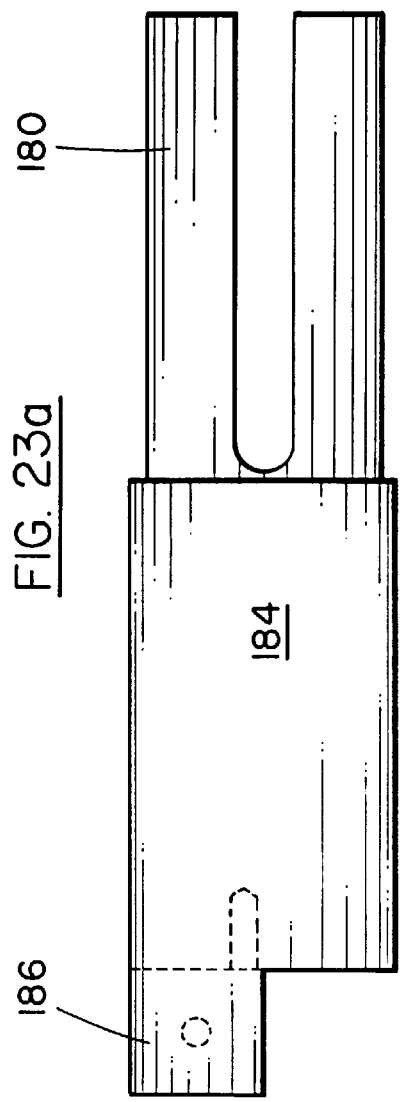
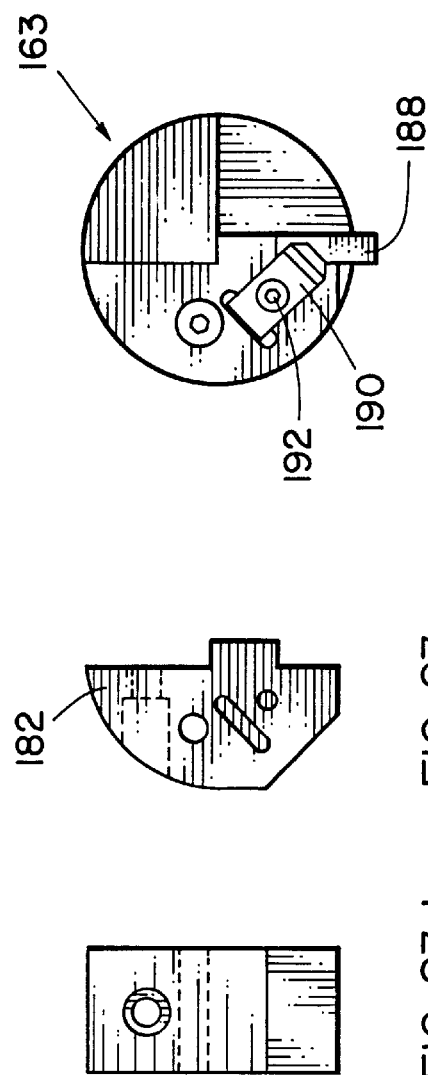
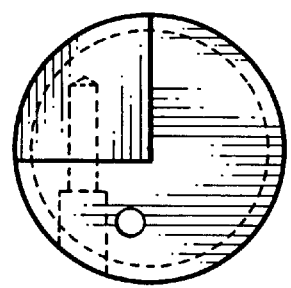

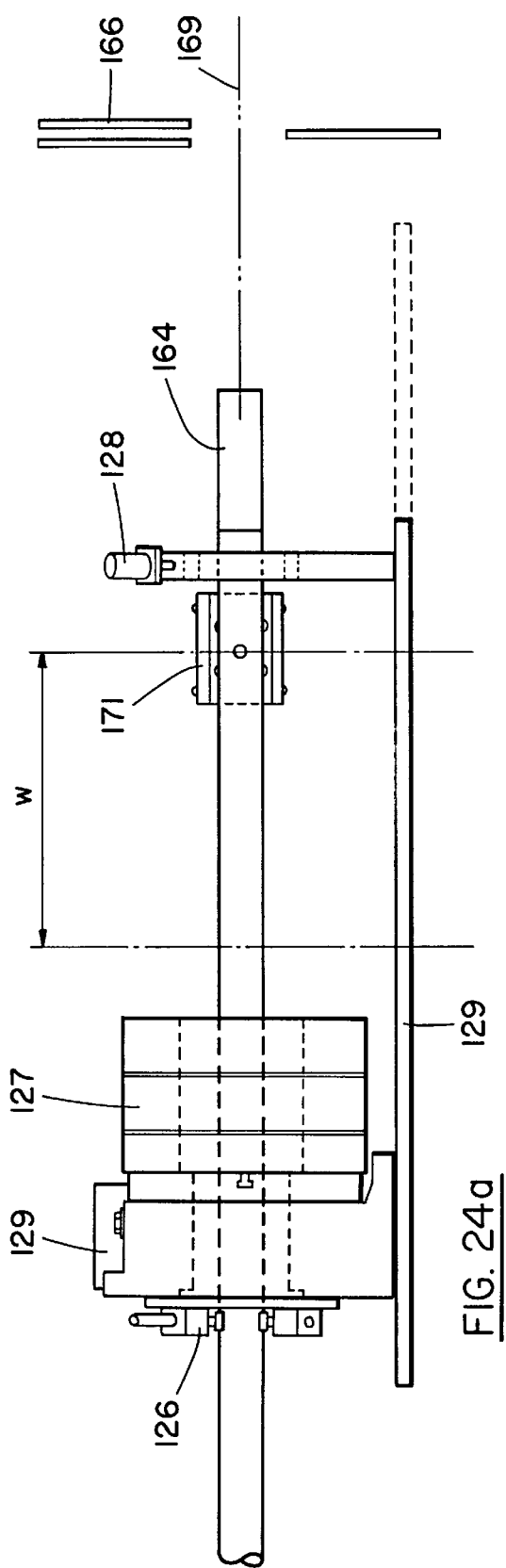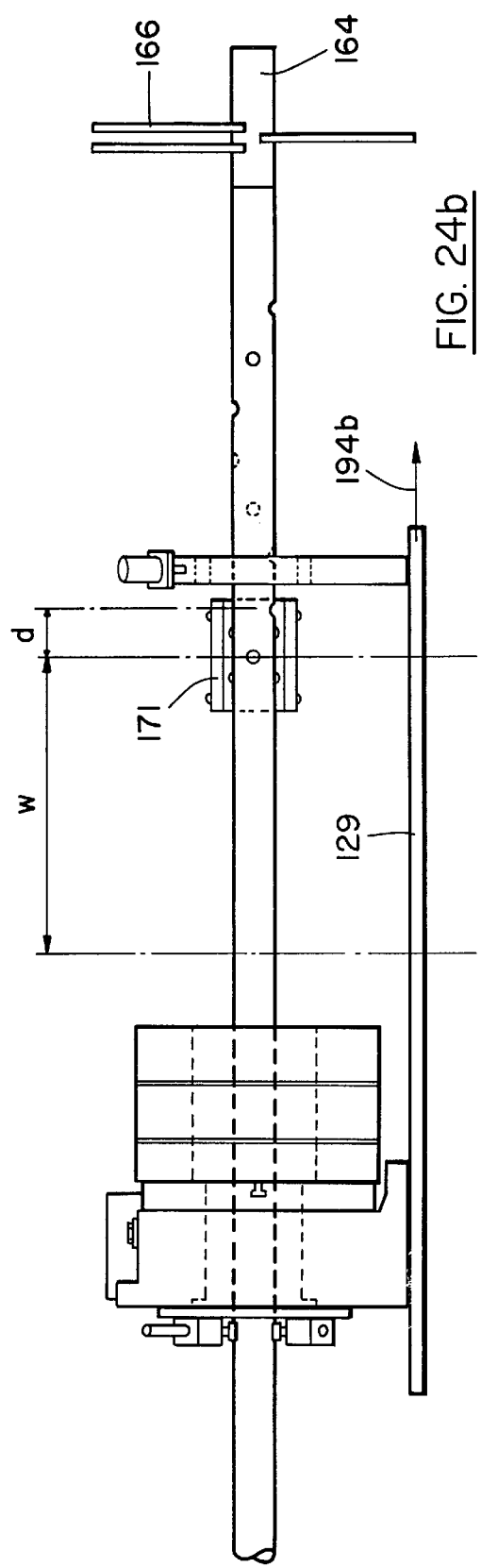

APPARATUS FOR MANUFACTURING A HOUSING FOR A PERFORATING GUN

FIELD OF THE INVENTION

This invention relates to a method and apparatus for manufacturing an outer housing for use as a part of an underground perforating gun of the sort used in the oil and gas industry.

BACKGROUND OF THE INVENTION

A perforating gun is typically used in the oil and gas industry by insertion downhole into a cased borehole for perforating the casing at a location adjacent a hydrocarbon containing formation. Such a gun is generally elongate and includes a number of charges spaced along its length. The charges are oriented such that when detonated, explosive forces are directed radially outwardly through the casing and into the formation.

A gun can be of any practical length but is typically between 0.5 and 10 meters. The overall diameter of a gun must be small enough such that the gun can be inserted into the borehole casing. The number and spacing of charges can vary and is determined by the requirements of a particular site.

A particular type of gun is expendable, i.e., is discarded after use, and this is the type of gun to which the invention described here pertains. Such a gun is also described in co-pending U.S. patent application Ser. No. 08/517,674 filed Aug. 22, 1995, which application names the same co-inventors as named for this invention and the specification of which co-pending application is incorporated herein by reference. The gun includes a charge holder on which the charges are mounted and an external housing. The charge holder with its mounted charges is sealed inside the housing so as to preclude the entry of dampness.

The outer housing of an expendable gun is typically of metal and is usually cylindrical having a circular outer cross-section to generally match the shape of the inside surface of the borehole casing. The housing, or carrier wall is generally between about 0.75 cm (0.3 inches) and about 1 cm (⅜ inches) thick. It is common for the carrier wall to have thinned or scalloped areas each being located to be aligned with a charge. Less explosive force is required to break through the thinned portion of the wall housing wall when the gun is detonated, as opposed to an unthinned portion. The scalloping thus improves the performance of a gun by increasing the amount of explosive force which makes its way through to the borehole casing and the formation.

As known to the inventors of the invention described in this specification, current methods for manufacturing a gun housing is a relatively labor intensive process. Stock pipe is cut to length, transported to a lathe, threads are turned in to a first end of the pipe, the pipe is re-positioned with respect to the headstock of the lathe, and threads turned in to the second end of the pipe. The pipe is then mounted in a clamp of a milling machine and the thinned areas described above are milled into the external side of the pipe wall.

The present invention is directed to improving this currently used system for producing an external housing in the manufacture of an underground gun.

SUMMARY OF THE INVENTION

The present invention provides an apparatus for manufacturing a machined article from a stock piece. The apparatus includes:

a machining device movable within a work area of the apparatus;

a movable base having first and second spaced apart clamps, mounted to the base, for securing the piece in a first clamped position in which a first section of the piece is located between the clamps; and a stationary third clamp mounted independent of the base, located to clamp onto the piece when the piece is secured in a the first clamped position, for holding the piece in a stationary position with respect to the base, to permit unclamping of the first and second clamps from the piece and movement of the base, to reposition the piece with respect to the first and second clamps, and securing of the piece by the first and second clamps in a second clamped position in which a second section of the piece is located between the first and second clamps; and wherein, the base is movable to permit positioning of the first and second sections of the piece in the work area, when clamped in the first and second clamped positions, respectively, for machining thereof by the machining device.

The invention permits a relatively automated, including pre-programmed computer controlled, manufacturing process.

In a particular embodiment, the apparatus is adapted for manufacturing a machined article from a tubular stock piece having a longitudinal axis wherein, the first and second clamps are oriented and the third clamp is located to permit mutual alignment of the first, second and third clamps when the piece is secured in the stationary position by the first, second and third clamps.

Preferably, the article of manufacture is a housing for an underground perforating gun.

Preferably, the base of the apparatus is rotatable about a generally upright axis and the first and second clamps are located such that, when the piece is in a the clamped position, the axis of the piece forms an angle of about 90° with the upright axis;

the apparatus further comprises a conveyor for the piece;

the conveyor has a first position which permits conveying of the piece in a direction parallel with the axis of the piece for receipt within the first and second clamps, when each of the first and second clamps is in an open position, in a first working position coincident with a clamped position in which a leading first end of the piece is located in the work area of the apparatus for machining by the machining device; and the conveyor has a second position to provide clearance for movement of the piece past the conveyor when the piece is secured in a clamped position and the base is rotated about the upright axis.

Preferably, the machining device includes a rotatable spindle for mounting of machining tools thereon, the spindle being rotatable about a generally horizontal spindle axis, and the conveyor, when in the first position, is located to orient the longitudinal axis of the piece so as to be parallel with the spindle axis.

More preferably, the base of the apparatus is rotatable about the upright axis by about 90° so as to move the piece from the first working position to a second working position in which a section of the piece is in the working area; and the third clamp is in a location remote from between the first and second clamps and the first, second and third clamps are in the mutually aligned arrangement, to permit step by step the repositioning of the piece from the second working position into a third working position in which a second end of the piece is, after rotation by the base by a further 90°, located in the work area.

In an alternative type of embodiment, the invention is a method for manufacturing a machined article from a stock piece. Method steps include:

(A) (i) clamping a tube with first and second spaced apart clamps, the clamps being spaced apart and affixed to a movable base of a manufacturing apparatus, with a first end of the tube proximate the first clamp;
  (ii) positioning the base to locate a first end of the clamped tube in a work area of the apparatus and machining the first end of the tube with a machining device of the apparatus;

(B) (i) clamping the tube with the first and second clamps, with a first portion of the tube between the clamps;
  (i) positioning the base to locate the first portion of the tube in the work area and machining the first portion of the tube with the machining device;

(C) (i) clamping the clamped tube with a third clamp mounted to the apparatus in a fixed position separate from the movable base, unclamping the first and second clamps from the clamped tube, positioning the base to locate a second portion of the tube between the first and second clamps, clamping the tube with the first and second clamps and unclamping the third clamp from the tube;
  (ii) positioning the base to locate the second portion of the clamped tube in the work area;
  (iii) machining the second portion of the tube with the machining device;

(D) (i) repeating steps (C)(i), (C)(ii) and (C)(iii) N times, as necessary, to machine N second portions of the tube, where N is a whole number;
  (ii) repeating steps (C)(i) and C(ii), as necessary to position a second end of the tube proximate the second clamp, and clamping the tube with the first and second clamps; and (E) (i) positioning the base after step (D)(ii) to locate the second end of the tube in the work area of the apparatus and machining the first end of the tube with the machining device of the apparatus.

Again, it is preferable for the machining steps and movement of the article of manufacture between various positions within the work area of the apparatus to be under computer control.

BRIEF DESCRIPTION OF THE DRAWINGS

A description of the preferred embodiment of the invention is described below, reference being had to the accompanying drawings, in which:

FIG. 1 is a schematic plan view showing locations of major components of a preferred embodiment system;

FIG. 2 is plan view of an outdoor storage area for stock tubing;

FIG. 3 is a partial elevational view of a storage rack taken along line 3—3 of FIG. 2;

FIG. 5a is a detail of a plunger for loading a stock pipe onto the conveyor system, viewed from the angle of FIG. 5, showing the plunger in an upper position;

FIG. 5b is similar to FIG. 5b, showing the plunger in a lower position;

FIG. 5c is a detail of the pair of plungers as viewed from the vantage point of FIG. 4;

FIG. 5d is a partial detail of the conveyor system taken along line 5d—5d of FIG. 5;

FIG. 12 is a sectional view taken along 12—12 of FIG. 6 and is an elevational view of the apparatus for loading a pipe from the in-feed rack temporary storage area onto the conveyer for transport to the work area;

FIGS. 23a to 23e illustrate a broach tool used for machining a key way into the end of a tube. FIG. 23a is a side view of the base of the tool;

FIG. 23b is an end view of the base shown in FIG. 23a;

FIG. 23c is an end view of a plate for attachment to the end of the tool shown in FIG. 23b;

FIG. 23d is a side view of the plate shown in FIG. 23c;

FIG. 23e is an end view, similar to that of FIG. 23b, of the completely assembled tool;

FIG. 24a shows the three clamping devices of the apparatus, the pipe being in an initial position with respect to the first and second clamping devices;

FIG. 24b is similar to FIG. 24a, the pipe being in an axially translated position with respect to the clamping devices;

FIG. 24c shows a pipe backing unit of an alternative embodiment of the invention as would be viewed from the left hand side of FIG. 24a;

FIG. 24d shows the pipe backing unit of FIG. 24c as viewed looking into FIG. 24a;

DETAILED DESCRIPTION OF PREFERRED EMBODIMENTS

Figure 4:
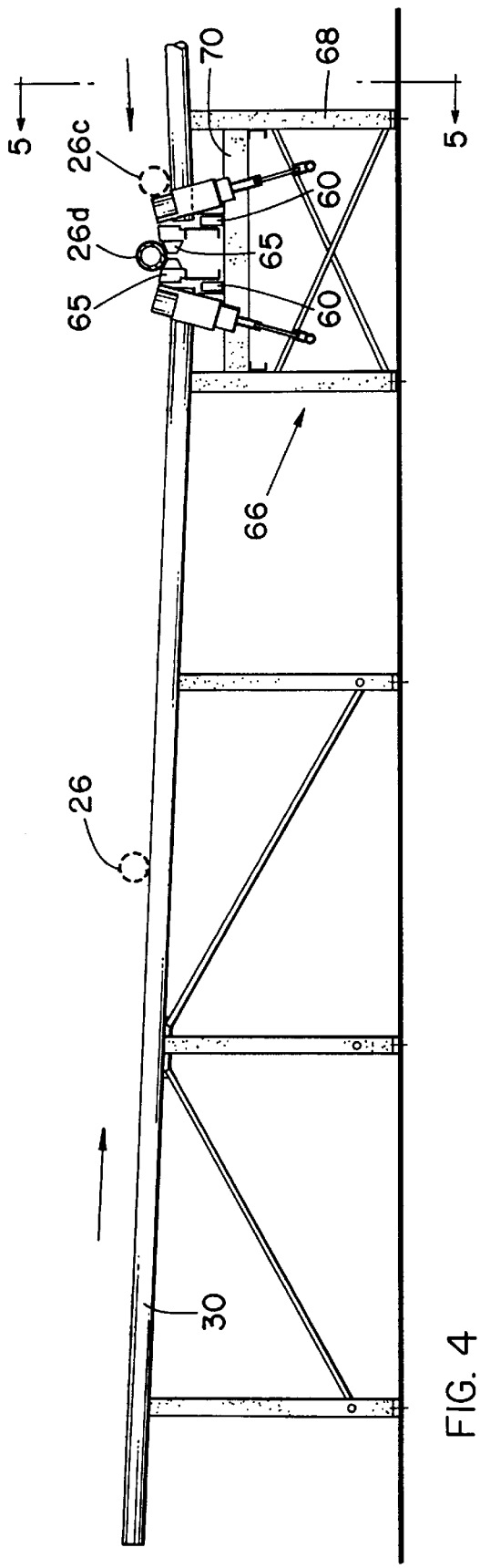
FIG. 4 is a partial elevational view of a storage rack and conveyor system taken along line 4—4 of FIG. 2.

Turning to the drawings, FIG. 1 is an overall schematic representation showing the various components of an apparatus 10 of the present invention. Generally speaking, a stock tube is moved from storage area 12, located out of doors, along conveyor system 14, cut to length at cutting station 16, as necessary, conveyed along roller conveyor 71 and then fed to temporary interior storage area 18. A given tube is selected as desired by a crane (not illustrated in FIG. 1) and fed onto conveyor 19 and into either of work stations 20. Finished tubular housings are conveyed along conveyor 19 away from work station 20 and transferred to storage area 22. The dashed line 24 represents the perimeter of the building in which the work stations are located.

FIGS. 2 to 5d illustrate the storage area 12 and conveyor 14 in greater detail. Stock tubes 26 are stored on racks 28a, 28b, 28c, 28d. Each rack includes three elevated, slightly sloping rails 30 in respective storage areas 12a, 12b, 12c, 12d. The rails are mounted on legs 32. Only one piece of stock tubing is illustrated in FIG. 2, for the sake of simplicity, but generally several tubes would be stored on each rack, and because of the slope of rails 30, tubes gravitate toward conveyor 14. The illustrated apparatus can process pipe having an outer diameter of from about 1 9/16 inches to about 8 inches. Stock tubing is typically 42 or 45 feet in length. A person skilled in the art could readily modify details of the apparatus described herein to process a workpiece outside this range of dimensions.

Conveyor 14 runs between paired racks 28a, 28b, and paired racks 28c, 28d. Conveyor system 14 includes carriage 34, which is pulled along rail assembly 36 by cable 38 connected at each end of the carriage. Cable 38, which is actuated by pulley 40, is pulled in the desired direction by operation of motor 44 in the appropriate rotational direction.

Generally speaking, for conveyance of a stock piece from either of racks 28a, 28b of the outdoor storage area into the building, the empty carriage is moved into the position shown in FIG. 2. Plungers 48a, 48b, 48c, associated with rack 28b, only one plunger 48b being visible in FIG. 5, operate simultaneously with each other. Further details of the plungers can be seen in FIGS. 5a to 5c. Piston 42 of each plunger is moved from it extended (upper) position shown in FIG. 5a into a lower position, i.e. retracted position, into its housing 50 as shown in FIG. 5b. This permits a stock tube 26c (shown in phantom in FIG. 4) to roll under the force of gravity into position atop the housings 50. The plungers are vertically extended into the position shown in FIGS. 4, 5, 5a and 5c, and the tube then rolls under the force of gravity into position on the carriage 34, illustrated for tube 26d in FIG. 4. Motor 44 is then actuated to move the carriage and the tube loaded therein, through an opening of the building wall 24 into the interior of the building.

Figure 5:
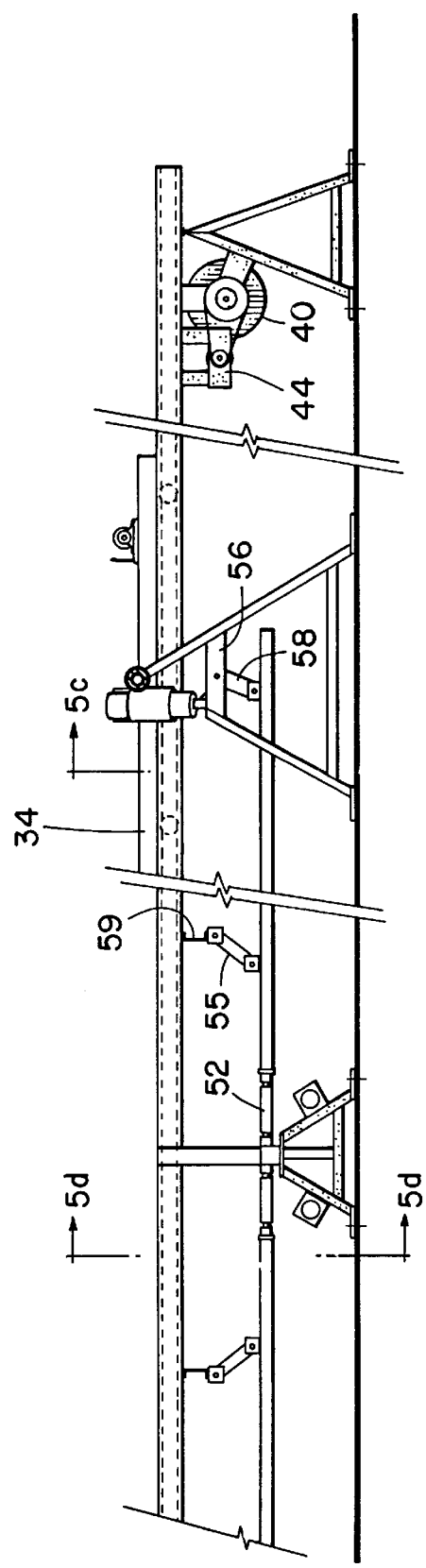
FIG. 5 is a partial sectional view taken along line 5—5 of FIG. 4.

Turning to FIGS. 4 to 5d, the arrangement of plungers 48a, 48b, 48c is described in greater detail. Only one of these, plunger 48b, is illustrated in FIG. 5, but the operation of all three is identical. Hydraulic cylinder 52, which operates reciprocally in the horizontal, is connected to horizontal member 54. Horizontal members 54, 56 are connected by tie member 58, which is pivotally connected at either end to respective members 54, 56. Member 57 is in turn rigidly connected (welded) to tie member 58 and the lower end of piston 42 as shown in FIGS. 5a and 5b. Extension of hydraulic cylinder 52 thus, through the pivotal connections, causes a lowering of piston 42 from the extended position of FIG. 5a into the retracted position of FIG. 5b. The pistons of plungers 48a, 48b, 48c, being similarly connected at their lower ends to member 54 are thus lowered simultaneously with each other. Correspondingly, retraction of hydraulic cylinder 52 leads to a raising of all three plungers 48a, 48b, 48c. A similar arrangement is provided for each set of three plungers associated with each rack.

Horizontal member 54 is connected through member 55 to cross-member 59 so as to stabilize longitudinal member 54 against deformation as it moves back and forth in the horizontal.

Turning to FIGS. 2, 4 and 5d, the arrangement of conveyor 14 is described in greater detail. Carriage 34 is mounted on wheels 60 mounted externally of C-channel members 62, the wheels riding in rails 64. Mounted on the carriage are three pairs of rollers 65, upon which the tube rests. Generally speaking, a pipe is greater in length than the carriage and in operation, the carriage is positioned prior to loading of the pipe so that a pipe will be axially centered on the carriage. A pipe is thus loaded with its leading edge overhanging the edge of the carriage. Rail stand 66 includes legs 68 and cross-members 70 to which rails 64 are mounted. Movement of carriage 34 along the rails is controlled by motor 44 connected through cable 38 to either end of the carriage. Operation of the motor to rotate pulley 40 in the clockwise direction as shown in FIG. 5 thus pulls the carriage toward the motor. Conversely, operation of the motor to rotate pulley 40 in the counter-clockwise direction pulls the carriage away from the motor.

FIGS. 6 to 11 illustrate that portion of apparatus 10 which cuts a raw tube to a desired length. A rubber bung is manually inserted into the leading end of the tube to contain fluids that flow into the tube during the subsequent cutting operation. Carriage 34 having a tube loaded thereon thus moves from right to left as viewed in FIGS. 7 and 8. The leading end of the pipe, moves onto roller conveyor 71, rollers of the roller conveyor being at the same height of those of the carriage for acceptance of the leading edge of the pipe thereon. Mounted at the side of roller conveyor 71 (to the left of the conveyor as viewed in FIG. 11) is a 360 inch glass scale measuring device 72 which operates in conjunction with the roller conveyor to position the stock tube with respect to cutting station 16 for cutting the tube to the desired length. Device 72 includes member 74 having transverse arm 76 located to be in the path of the tube as it travels along the roller conveyor. Member 74 is slidingly connected at the side of the roller conveyor so that when the forward moving end of the pipe comes into contact with the arm, the member travels along with the end of the pipe. Member 74 is connected to the glass scale contact 78 which tracks the distance traveled by member 74 along the conveyor, and thereby determines the distance travelled by the tube. Member 74 slides on chrome rods 80 which is moved forward by the powered rollers of the roller conveyor, and when the tube has travelled the distance required to bring the pipe into the desired position with respect to cutting station 16, an operator stops the motor. The glass scale measuring device 72 is commercially available and is manufactured by Acu-Rite Corporation, Model AR-10 of the United States. The measurement from the scale is relayed to the work station computer 160 for use in finishing the tube, farther details being described below.

The tube is secured in the cutting position by a clamp device which is a part of saw 84. The cutting operation is performed by saw 84. Saw 84 is commercially available under the name Hyd-Mech Model S-20 from Hyd-Mech Saws Ltd., Ontario, Canada.

Once the cutting operation is complete, the clamp is released to free the tube. The forward end of the tube is then raised by cylinder 86 to drain cutting fluids that may have entered into the tube during the cutting operation. The tube is then lowered back onto conveyor 71, and any remaining debris is vacuumed from the tube interior after which a second bung is inserted in the back end of the tube.

Ejector 88 is then actuated. Extension of ejector hydraulic cylinder 90 causes rotation of "V"-shaped arm 92 in the clockwise direction, as viewed in FIG. 9, which pushes the tube sideways into in-feed storage rack 18.

FIGS. 6 and 12 through 14 illustrate temporary storage area 18 and cranes 96, which together are capable of selecting any tube stored in the area for queuing for loading onto conveyor 19 for delivery of the tube to work stations 20. Although the various components of each crane 96 are driven by hydraulic motors, the individual operations involved in loading a tube onto conveyor 19 are operator controlled. Cranes 96 are mounted for travel along rails 94 secured to the floor. Cranes 96 are driven by a hydraulic motor connected to a common axle (not shown). An operator thus actuates the device for movement along the rails to bring arms 98 connected to chain sliding apparatus 100 mounted on cross-member 101 into vertical alignment with the tube to be re-queued on in-feed rack ready for elevation onto conveyor 19. Each upper portion 102 of crane 90 is under the control of hydraulic motors for vertical movement while each arm 98 is also under independent control of electric motors. By appropriate vertical movement of upper portions 102 and horizontal movement of arms 98 along cross-member 101 the arms are inserted into respective ends of the desired tube. See FIG. 6. The selected tube is then raised and cranes 96 are moved toward conveyor 19 to bring the tube into a position nearest the conveyor and the tube is then deposited upon rails 104 of the storage area. The rails 104 slope gently downward in the direction from conveyor 14 to conveyor 19. The rails are inclined sufficiently for tubes deposited into the storage area to roll into position adjacent conveyor 19. See FIG. 12.

Elevator 106 is brought by hydraulic motor 114 into a lower position, (shown in phantom in FIG. 12) if not already in such position, such that it is located below the tube adjacent the conveyor. The elevator is then raised into the upper position shown in FIG. 12. Surface 108 is inclined gently toward conveyor 19 so that once elevator 106 reaches its upper position, the tube resting thereon rolls under the force of gravity onto conveyor 19. Sprockets 116 are driven through chain 118, the sprockets being gearingly connected to drive rollers 110, 112. Upward or downward operation of the motor causes the elevators 106 and 176 (see below) to move in synchrony with each other: as one elevator moves up the other moves down.

Figure 12A:
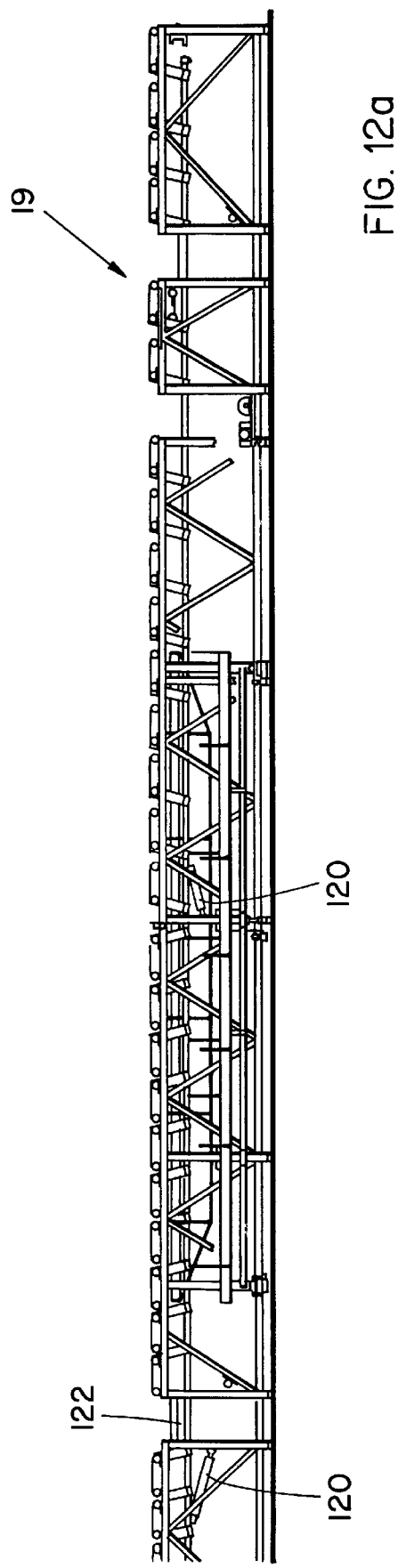
FIG. 12a is an elevational view of a roller conveyer running between the in-feed rack (internal storage) area and work stations.
Figure 14:
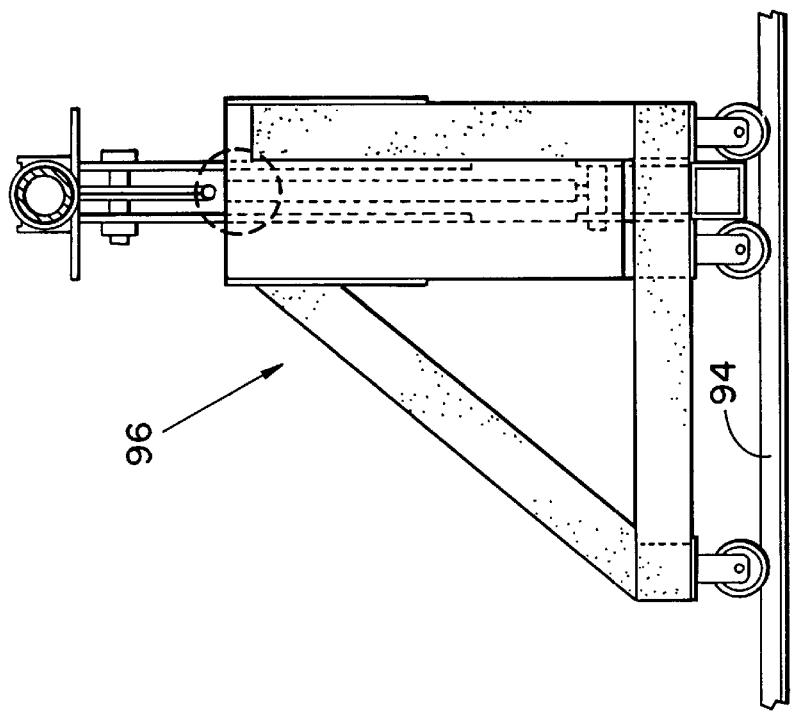
FIG. 14 is a side view of the apparatus shown in FIG. 13 as viewed from the right hand side of FIG. 13.
Figure 13:
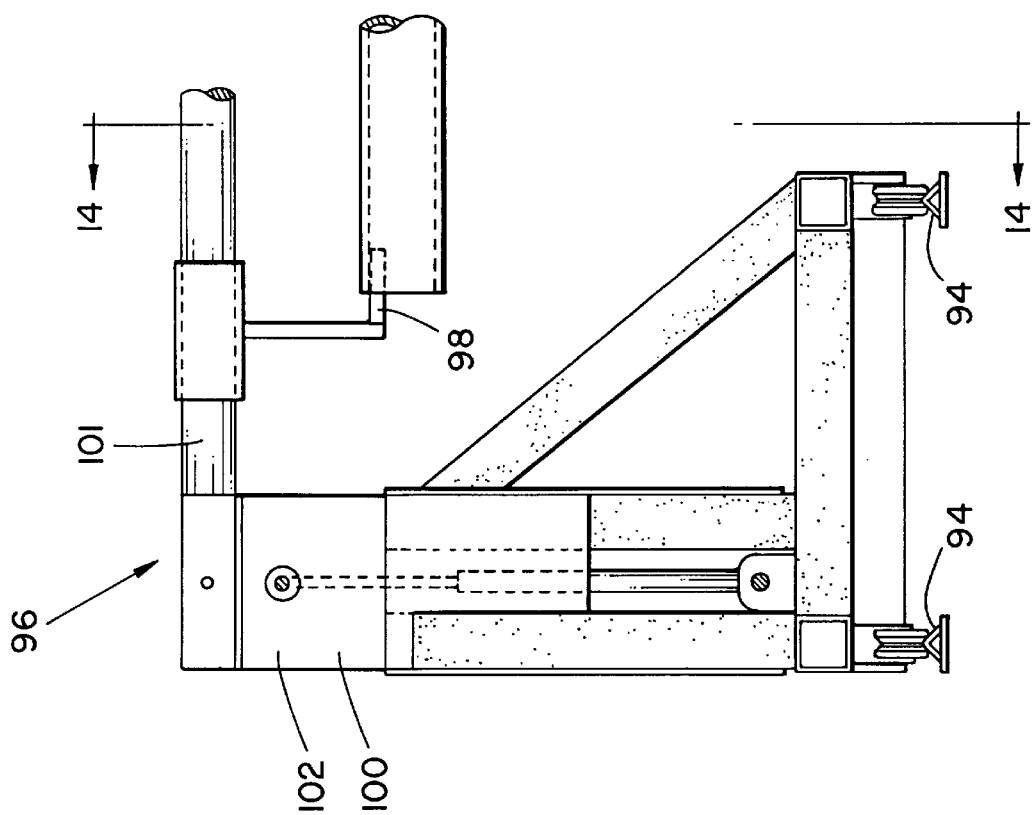
FIG. 13 is an elevational view taken along 13—13 of FIG. 6 of the apparatus for selectively queuing, if desired, a pipe on the in-feed rock.

Conveyor 19 includes a series of rollers 110, 112, horizontally aligned with each other and running the length of the conveyor, upon which the tube sits, the rollers being paired and shaped to hold the tube therebetween, as seen in FIG. 12. The rollers are connected by chains and are under separate control of an hydraulic motor.

The height of conveyer rollers 110, 112 can be adjusted, the entire series of rollers being movable together to retain their horizontally aligned position. Hydraulic arm 120 controls the height of rack 122 on which the rollers are mounted.

Figure 6:
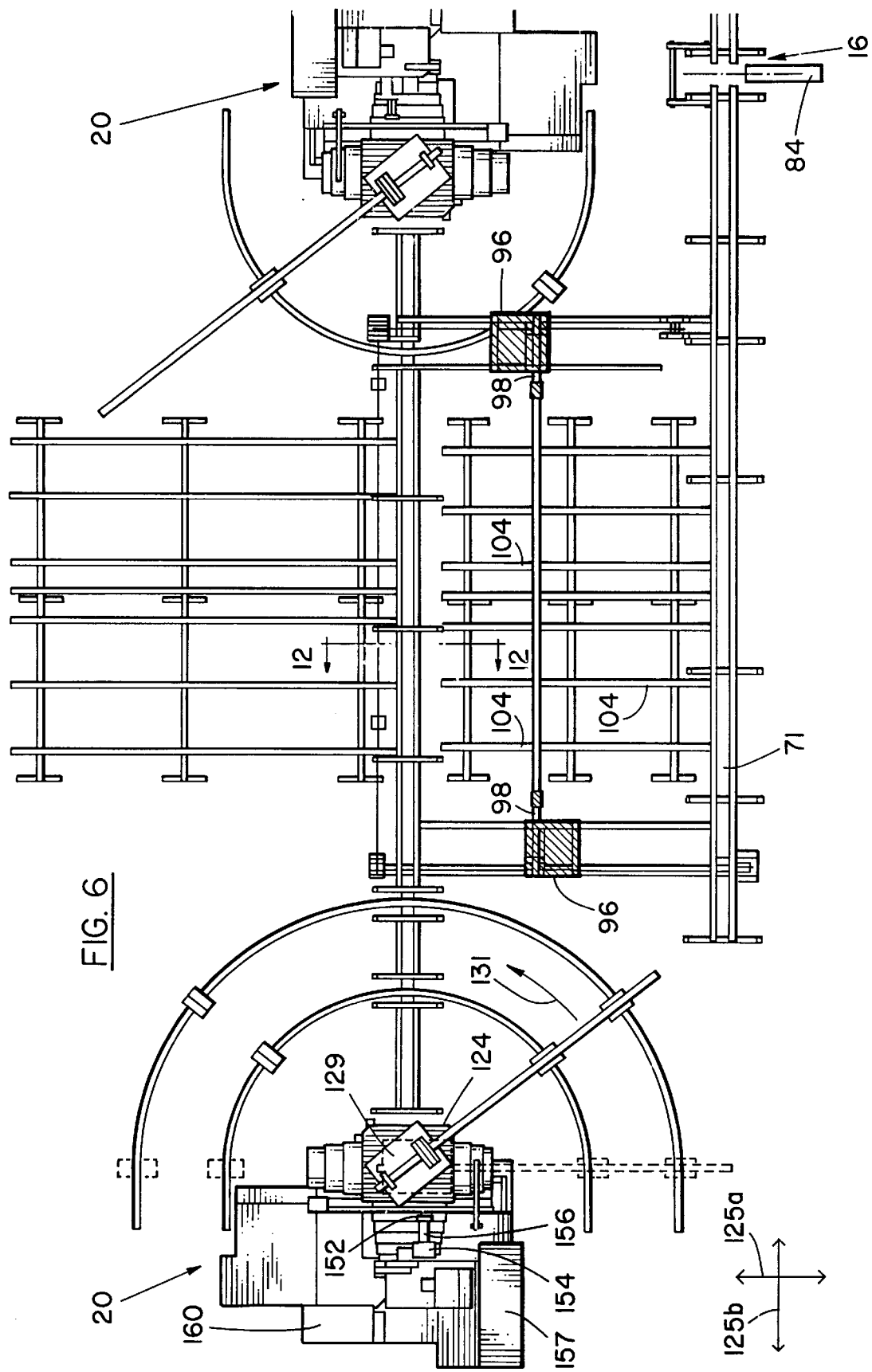
FIG. 6 is a plan view of the interior portion of the apparatus.
Figure 7:
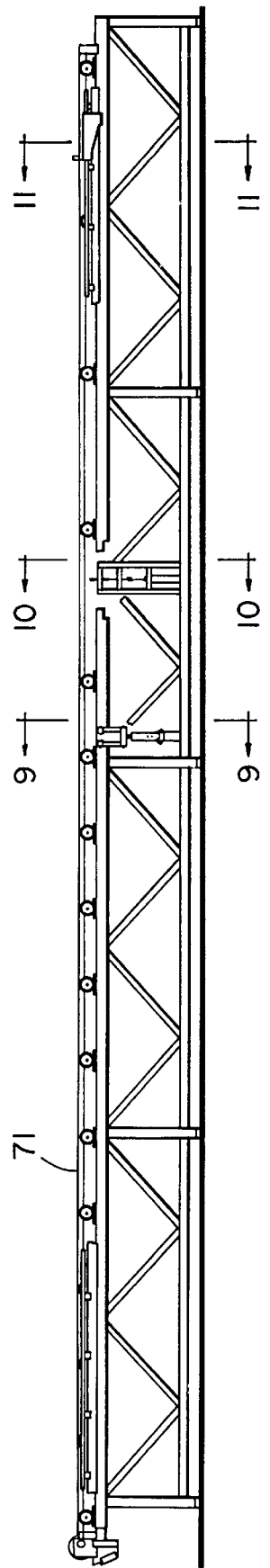
FIG. 7 is a side view of the indoor portion of the conveyor system and location of the cutting station.
Figure 8:
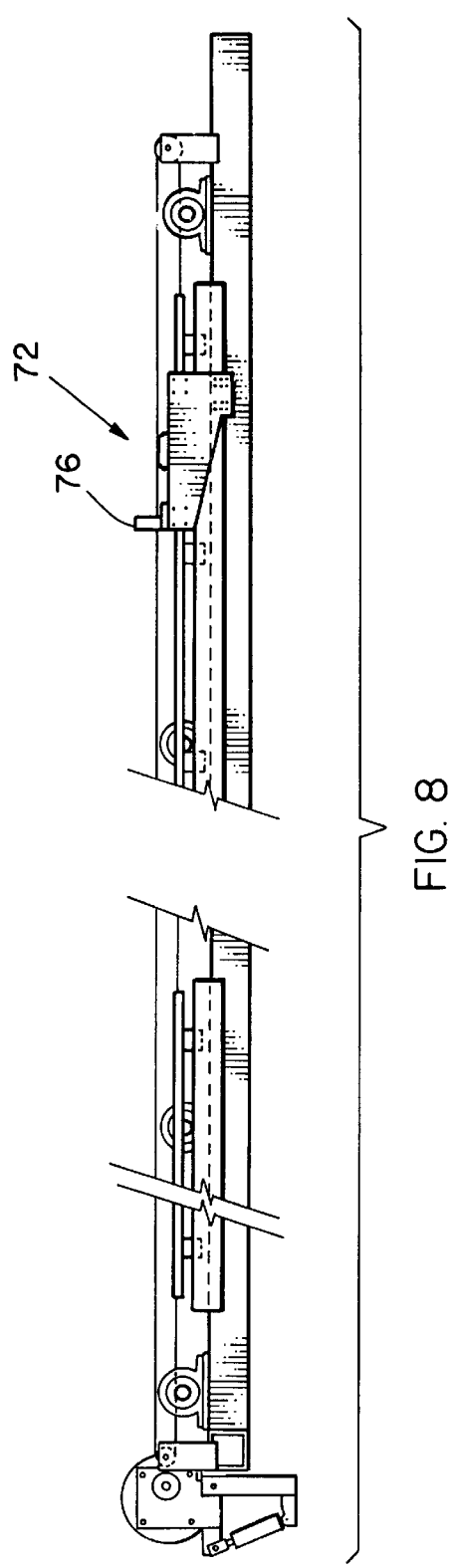
FIG. 8 is a side view of the apparatus for measuring and cutting stock tubing to length.
Figure 11:
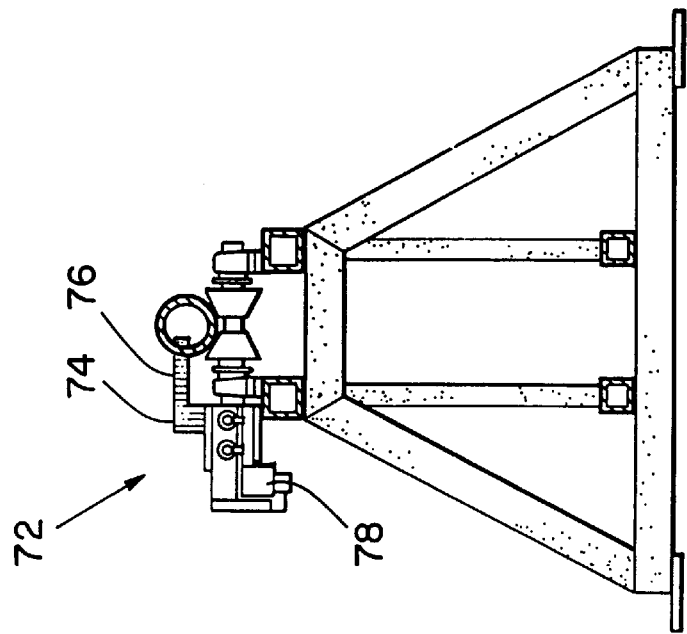
FIG. 11 is a sectional view taken along 11—11 of FIG. 7.
Figure 10:
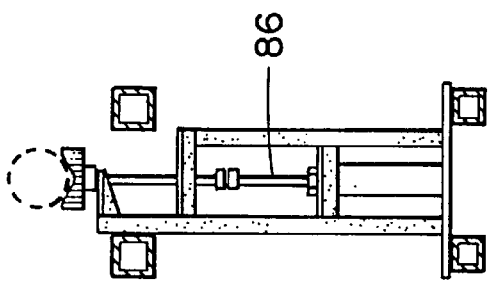
FIG. 10 is a sectional view taken along line 10—10 of FIG. 7, showing a plunger used in draining a stock tube immediately after cutting.
Figure 9:
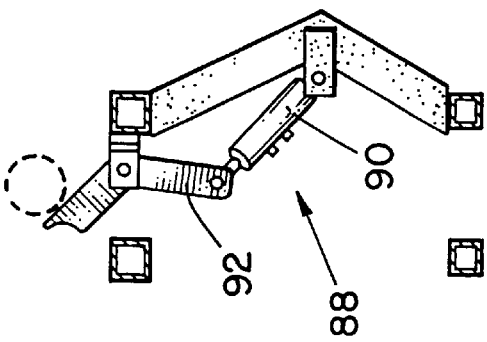
FIG. 9 is a partial section of the measuring apparatus taken along line 9—9 of FIG. 7.
Figure 15:
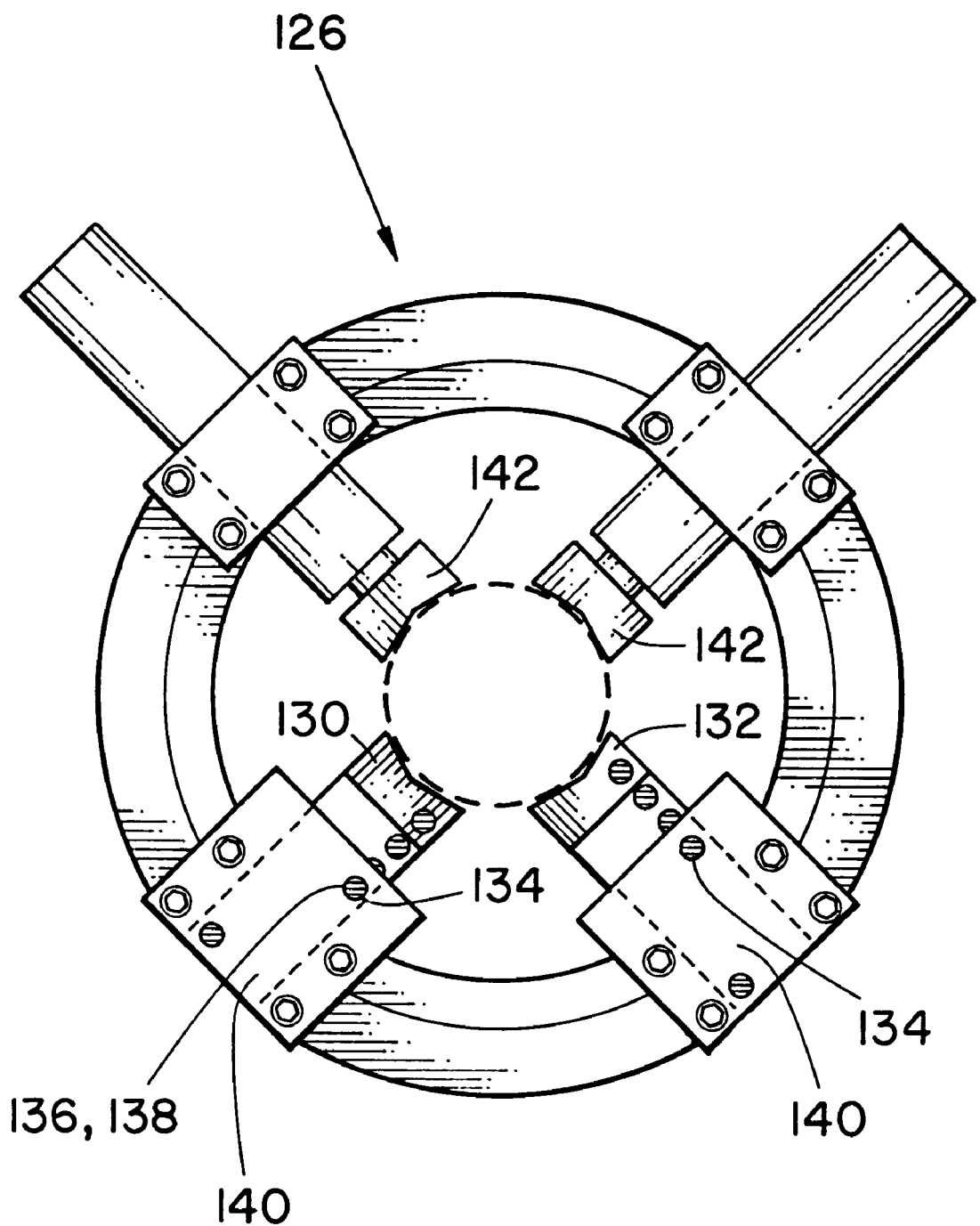
FIG. 15 is a side view of a rotatable first clamping device for securing a pipe in the work station.
Figure 17:
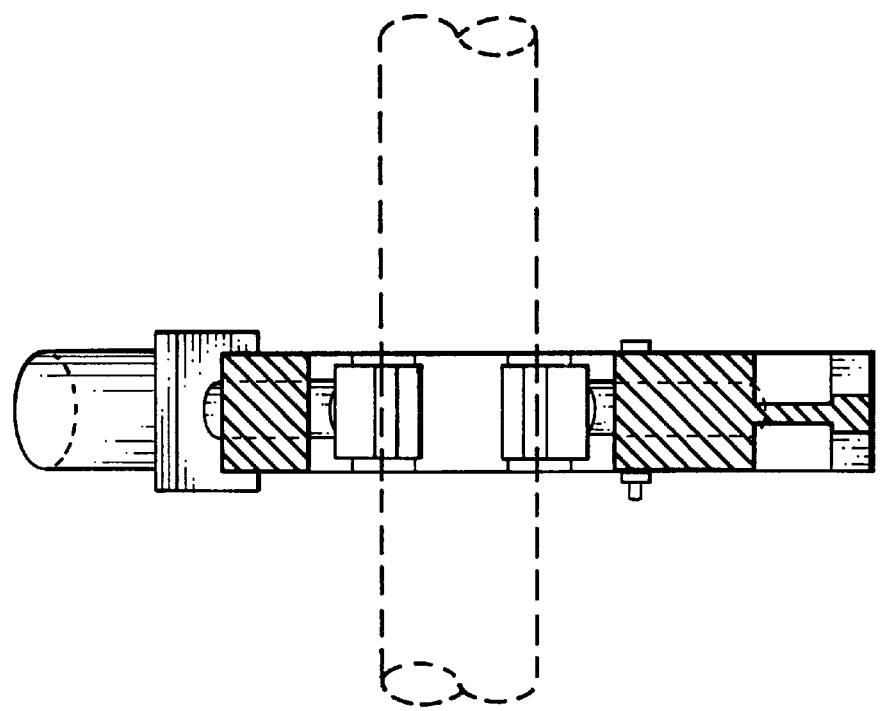
FIG. 17 is a partial sectional view of the second clamping device taken along line 17—17 of FIG. 16.
Figure 16:
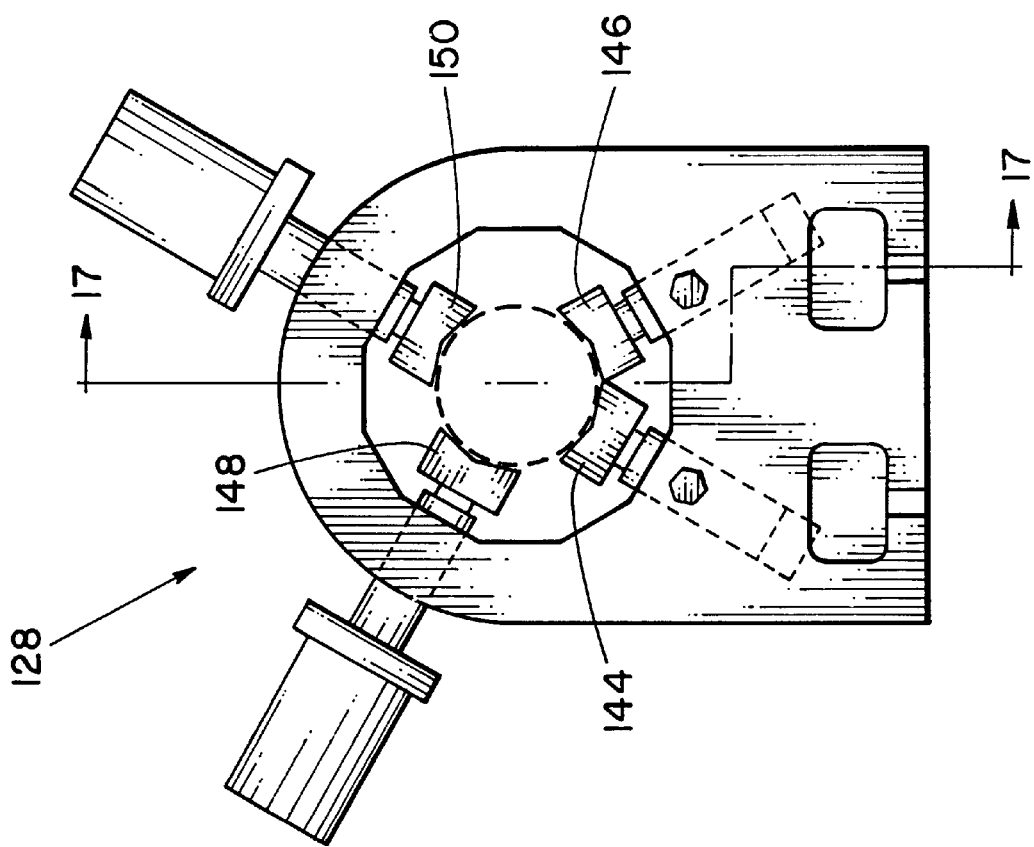
FIG. 16 is a side view of a rotatably fixed second clamping device for securing a pipe in the work station.
Figure 20:
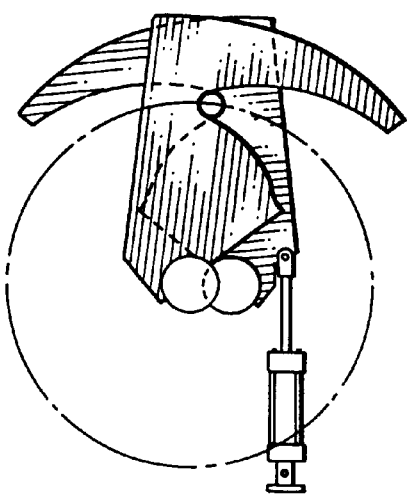
FIG. 20 shows the third clamping device having a pipe of 1 9/16" outer diameter secured by its jaws.
Figure 19:
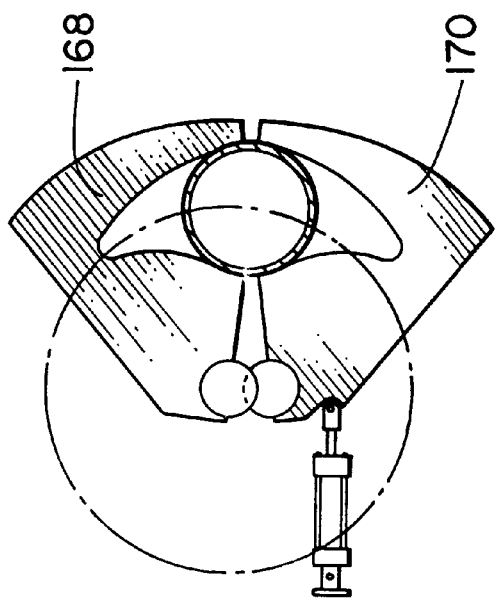
FIG. 19 shows the third clamping device having a pipe of 7" outer diameter secured by its jaws.
Figure 18:
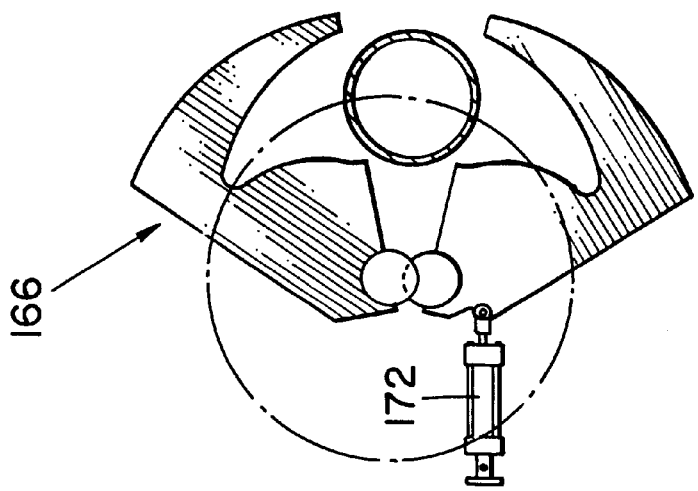
FIG. 18 shows a third clamping apparatus for securing the position of the pipe during repositioning of the first and second clamping devices, jaws of the apparatus being in an open position.

Turning to FIG. 6, work table 124 is positioned for delivery of a tube into a work station 20. Work table 124 is included as part of a commercially available milling machine sold by Toshiba Machine Co. under Model BTD-200QE with a thirty-tool ATC (Automatic Tool Changer) and 1600 r.p.m. spindle and Tosnuc T-777.2 computer controller. Work table 124 is driven by an electric stepper motor which is part of the milling machine, and is not illustrated. Work table 124 has mounted thereon, a rotary table 129 which is mounted with assembly 126 (FIG. 15) and clamping assembly 127 which is an air operated chuck and tube securing assembly, "steady rest" 128 (FIGS. 16 and 17). Table 129 is rotatable about a vertical axis centered in the circle containing arc 131 shown in FIG. 6. For receipt of a tube through assemblies 126, 127, 128, 129 work table 129 is rotated into position with its lengthwise axis parallel with that of conveyor 19, in which assembly 126 is nearest conveyor 19. Generally speaking, a tube is to be received into assemblies 126, 127, 128, 129 so as to be centered therein, as illustrated in FIGS. 15 to 17, as described in more detail immediately below.

Prior to insertion of the tube into assembly 126, the positions of lower supports 130, 132 are adjusted, as necessary, to accommodate the diameter of the tube. Pins 134 are thus removed and the height of each support adjusted, apertures 136 of the supports being aligned with apertures 138 of support block 140 and pins being inserted therein.

Upper arms 142 of assembly 126 are hydraulically retracted to permit insertion through the center of the assembly.

In a similar manner, the height of lower support members 144, 146 of non-rotatable (steady rest) securing assembly 128 are adjusted as for assembly 126, as necessary, to accommodate the outer diameter of the tube, and upper, hydraulically controlled cylinders 148, 150 are retracted to permit insertion of the tube through the center of clamping assembly 128.

Figure 22:
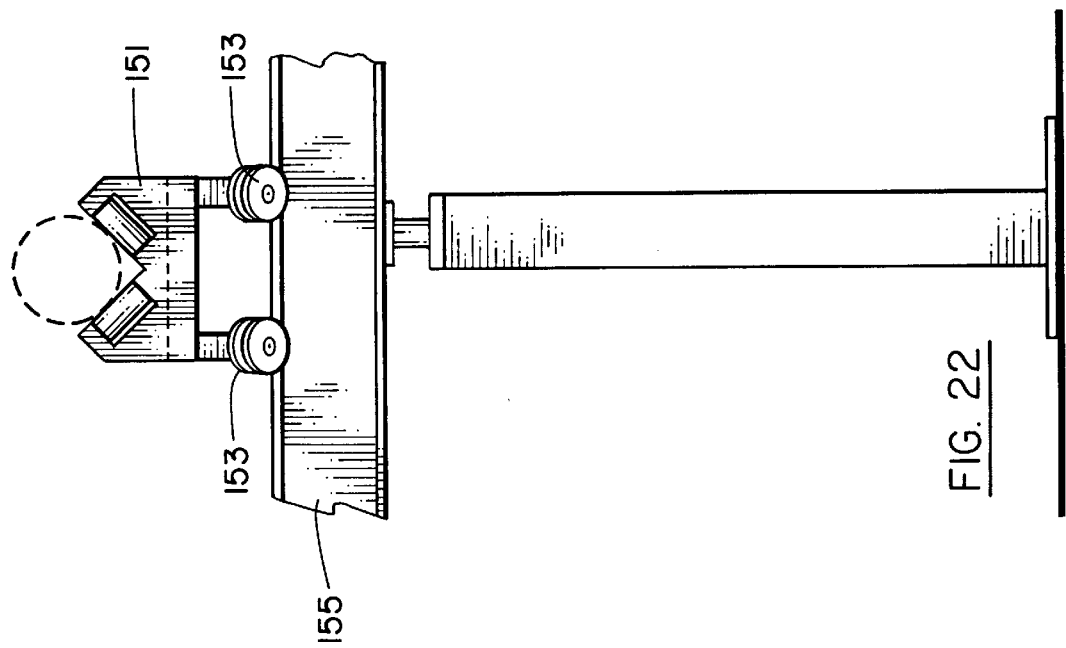
FIG. 22 shows the support apparatus of FIG. 21, as viewed from the right hand side of FIG. 21.
Figure 21:
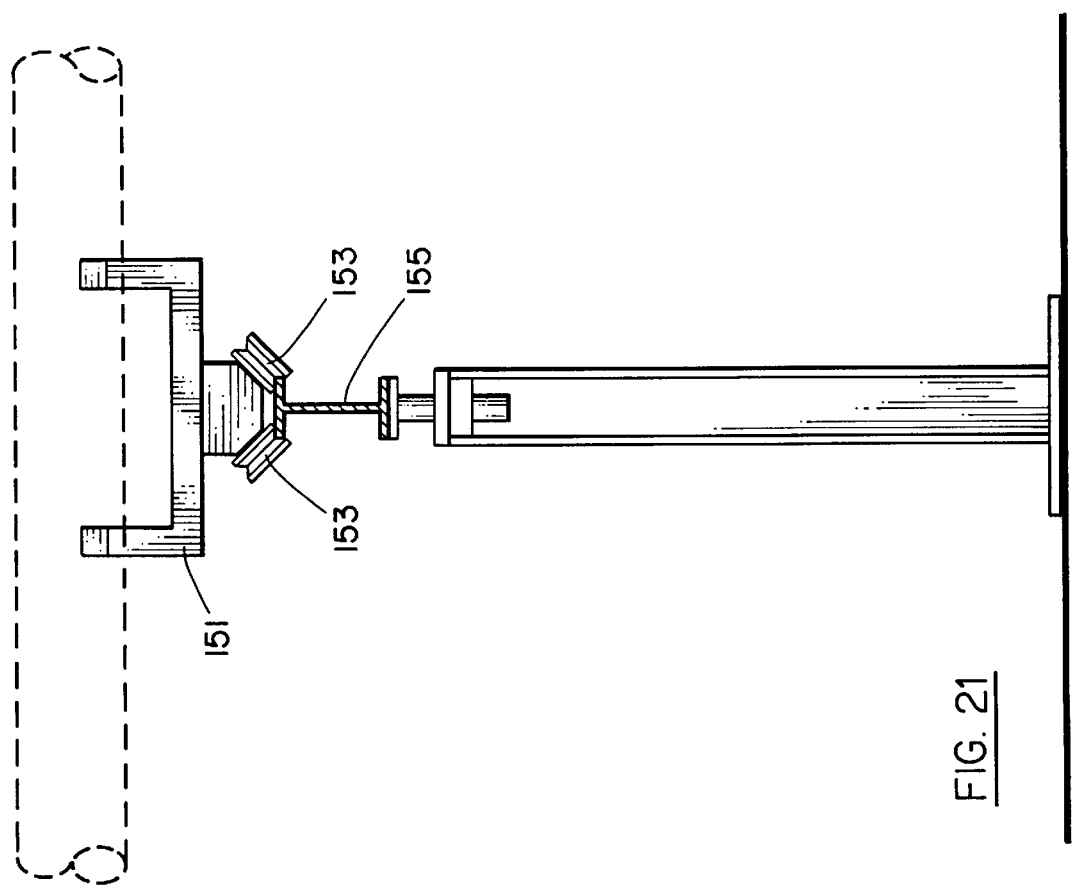
FIG. 21 shows a detail of a support apparatus for a portion of a pipe when the pipe is located in the work station.

Supports 130, 132, 144, 146 having been suitably positioned, and table 129 being rotated into position and height adjusted appropriately, so that clamps are aligned for receipt of the tube, rollers 110, 112 are activated and the tube conveyed through the clamp assembly apertures. Eventually, the leading end of the leading end of the tube comes into contact with "home plate" 152, which is installed as one of many "tools" installed on the driver of the apparatus, described further below. See FIG. 6. The rollers are deactivated and conveyor 19 is lowered vertically to bring the pipe to rest upon rail-guided supports 151, (FIGS. 21 and 22) which supports are vertically aligned with the lower support members of clamping assemblies 126, 128 by adjustment of the height of the work table. Rollers 153 of supports 151 rest upon and are guided by arcuate rails (I-beams) 155 for rotation of the pipe as indicated in FIG. 6 (arrow 131), the purpose of which is explained below. Cylinders 142, 148, 150 are extended to secure the tube in place. Home plate 152 is then removed. The arrangement is such that the programmed computer knows the location of the leading end of the tube with respect to the contact position with home plate and the tube is thus in a secured position for a first series of computer-controlled machining operations to be carried out. Once clamped into the apparatus, all further operations involving tables 124, 129 and the milling machine are generally under the control of computer 160. Operations can be pre-programmed, a sample programme developed for the production of a particular gun housing is given in Appendix A.

Figure 26A:
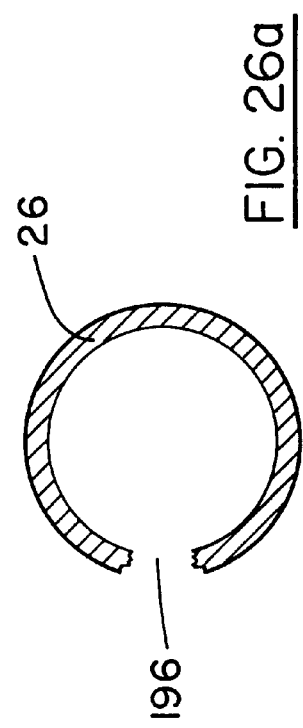
FIG. 26a is a cross section of a finished pipe of a "port plug" gun housing.
Figure 26:
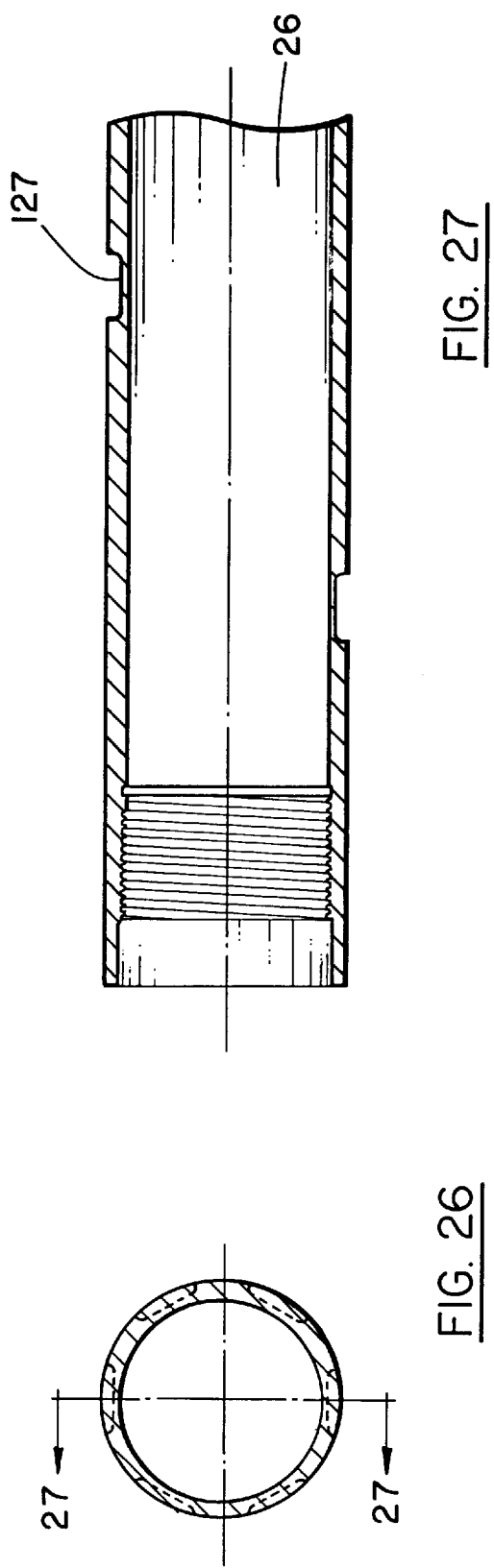
FIG. 26 is a cross section of a finished pipe having scallops machined thereinto.

Pipe leading end 26a is thus suitably positioned for processing of the rim of the pipe by milling tools sourced from the ATC of apparatus 154, the rotational axis of the driver 156 of the machining apparatus being generally parallel to the longitudinal axis of the pipe. Appropriate milling tools are used to shape the end of the pipe with threads, chamfers, etc. Machining apparatus 154 includes magazine 157 for storage of the various tools which can be secured to the drive mechanism 156 as needed. Tools are moved between magazine 157 and driver 156 of the machining apparatus by a tool changer which is provided as part of the Toshiba apparatus (not illustrated) and is under motorized control of computer 160 through drive mechanism 162. All motor actuated movements of driver 156 of the machining apparatus, i.e., translational movements of the device as well as rotation of the tools are under control of computer 160. The driver and computer form part of the commercially available unit sold by Toshiba Machine Co. Work table 124 is capable of motorized movement, under control of the computer, in the horizontal directions indicated by arrows 125a, 125b while machining apparatus (and its rotating spindle) is movable vertically for machining operations. It is thus possible, through cooperative movements of the table and the machining apparatus to shape the end of the pipe as desired. For example, viewing the end of the pipe to be machined as oriented in FIG. 26, a simple chamfer could be machined onto the lower portion of the pipe end by downward and then upward movement (y-axis) of machining apparatus as the table moves from left to right (x-axis). Threads could be machined onto the lower portion of the pipe end by similar movement with the additional movement of the table into or out of the page (z-axis), as appropriate. Generally, at least milling of threads into the interior of the end of the pipe is carried out.

In the manufacture of a particular embodiment housing, a seal bore is rough cut into the end of the pipe with a thread bore. Following this, a seal finish bore, and the radius, face and chamfer on the end of the pipe are milled into the end. The magazine of the milling machine includes pockets that hold the tools used for the various milling operations and the machining apparatus moves between the work area "W" and the magazine as necessary for installation of a tool on the driver and insertion of a tool into its pocket for storage when not in use. Included are tools: for boring a diameter in preparation for threading; for preparing a seal bore; for milling down the flat end of the pipe to obtain the finished pipe length; for chamfering (e.g. a 0.03×45' chamfer); and for milling an internal radius (e.g. 0.12 radius). The next action may be to broach a keyway down the inside wall of the pipe. The keyway aids in alignment of internal components of the gun and is cut with tool 163. Alternatively, holes may be milled through the wall of the pipe to for joining finished pipes end-to-end without threaded devices (e.g. with non-threaded 4 pin 2×O-ring devices or combinations of both). Following this, an assortment of grooves may be cut round the inside and outside of the pipe to further accommodate alignment and security of internal components to be installed later and to aid in identification.

Broach tool 163 is shown in FIGS. 23a to 23e. End 180 is suitably shaped for receipt thereonto of a conical piece, the same for all tools, having housing a standard end for receipt within the jaws of a chuck of the driver. The tool includes plate 182 which fits onto the base 184 of the tool at end 186. Cutting bit 188 is secured to the base against the plate by clip 190 fastened to the base by bolt 192. In use, bit 188 is brought into contact with an interior surface of the pipe end by reciprocating motion of the tool, material is removed from the pipe on the backstroke.

Once the machining operations to the end of the pipe are complete, a pipe extension 164 (FIG. 24a) bearing external threads complementary to those on the interior work piece is screwed onto the end the pipe. Table 129 is then rotated 90° in the counterclockwise direction (i.e., from the three o'clock position to the twelve o'clock position) in the direction of arrow 131 as viewed in FIG. 6, into the position shown in FIG. 24a.

The pipe is positioned for machining operations on that portion of its outer curved surface located between the clamping apparatuses 127, 128. By movement of table 124 in a direction parallel to arrow 194b (FIG. 24a) the pipe is positioned axially with respect to machining apparatus 156 for milling of a scallop 127 (FIG. 25) (or drilling and tapping a hole 196 extending through the pipe, as in the case (FIG. 26a) of a "port plug" gun housing) into the outer curved surface of the pipe. The pipe is rotated about longitudinal axis 169 for circumferential positioning of the pipe for installation of a scallop by releasing of clamps 128 and 126 and rotation of clamp 127. Thus, the tube is released from clamp 128 by retraction of upper cylinders 148, 150 and from clamp 126 by retraction of upper cylinders 142 and the tube is rotated by rotation of clamping apparatus 125. Once in the desired position for the next machining operation, the tube is resecured by re-extension of the upper cylinders of clamps 128 and 126. In this way, access is provided to any circumferential area of the tubular surface to machining apparatus 156.

Once all the portions of the tube located in the work area between clamps 126, 128 are machined, the table is positioned to bring the pipe extension so as to be located between open jaws 168, 170 of clamping apparatus 166 which are closed onto the pipe through extension of hydraulic cylinder 172. See the position of the table shown in phantom in FIG. 24a. As illustrated, the jaws of clamping apparatus 166 are configured to accommodate pipe of any outer diameter that would typically be processed by the apparatus. After the pipe is secured by clamp 166, the hydraulic cylinders of clamping devices 126, 127, 128 are retracted to release the pipe therefrom. Work table 124 is then moved along the axial direction of the pipe, from right to left as viewed in FIG. 24a, and brought into the position shown in FIG. 24. In this way, a second section of the curved surface of the tube is brought into position between clamping devices 127, 128. The hydraulic cylinders of clamping devices 126, 127, 128 are re-extended to again secure the pipe by clamping devices 126, 127, 128 and the jaws of clamping device 166 are released from the pipe. Work table 124 is then moved axially back into position (i.e., toward the six o'clock position in FIG. 6) so as to locate the next section of tubing to be machined, i.e., that tubing portion located between clamps 127, 128, in the work area "W" of the machining apparatus. The next section of the curved surface between the two clamps is then processed, the tube shuttled along to move the next section to be finished into the work area, etc., until the tube is fully axially translated with respect to clamping devices 126, 128. Once the machining operations to be carried out on the curved outer surface portion of the tube are complete, work table 129 is again rotated in the clockwise direction as indicated in FIG. 6, to the three o'clock position. The pipe is now in the same location as it was upon its initial conveyance into the work area, but its position is reversed. That is, tube end 26b is now in the work area. The interior portion of tube end 26b is then machined as desired to complete the machining of the tube. The tube is then conveyed along conveyor 19 and lifted from the conveyor by arm 174 onto cradle 176 in an upper position (not shown in FIG. 12). The cradle then moves into the lower position shown in FIG. 12, and comes to rest on rails 105 (clockwise direction as viewed in FIG. 12) and the finished pipe rolls under the force or gravity into storage area 22.

Single conveyor 19 is used to deliver stock pipes to both work stations 20 and to convey finished pipes to storage area 22. When not conveying a pipe, the roller conveyor is lowered into a position which provides clearance for the pipe resting on track 151 to be rotated away from conveyor 19. When a pipe in one of the work stations is positioned away from conveyor 19 (e.g., when scallops are being milled into its sides) the conveyor can be freely operated for movement of another pipe between the other work station and storage areas 18, 22.

Figure 24C:
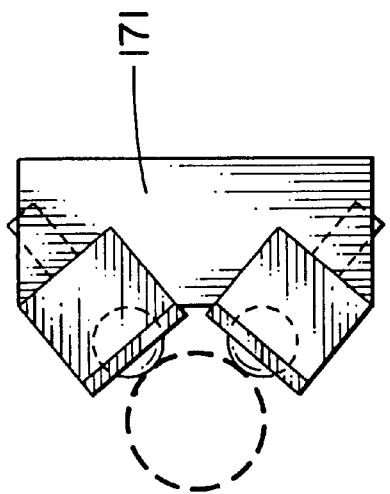
Figure 24D:
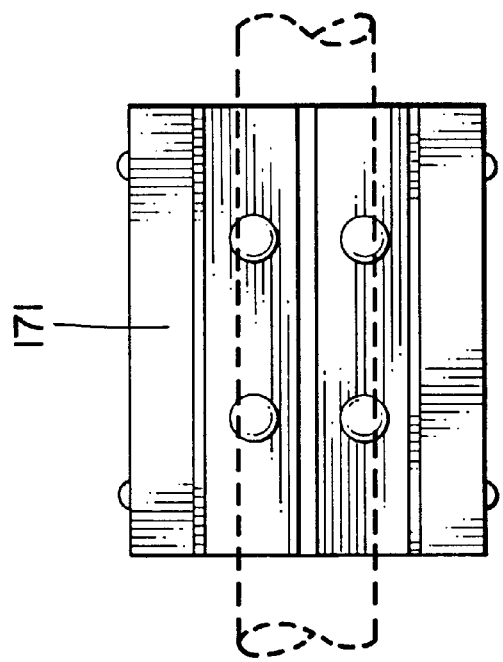
Figure 25:
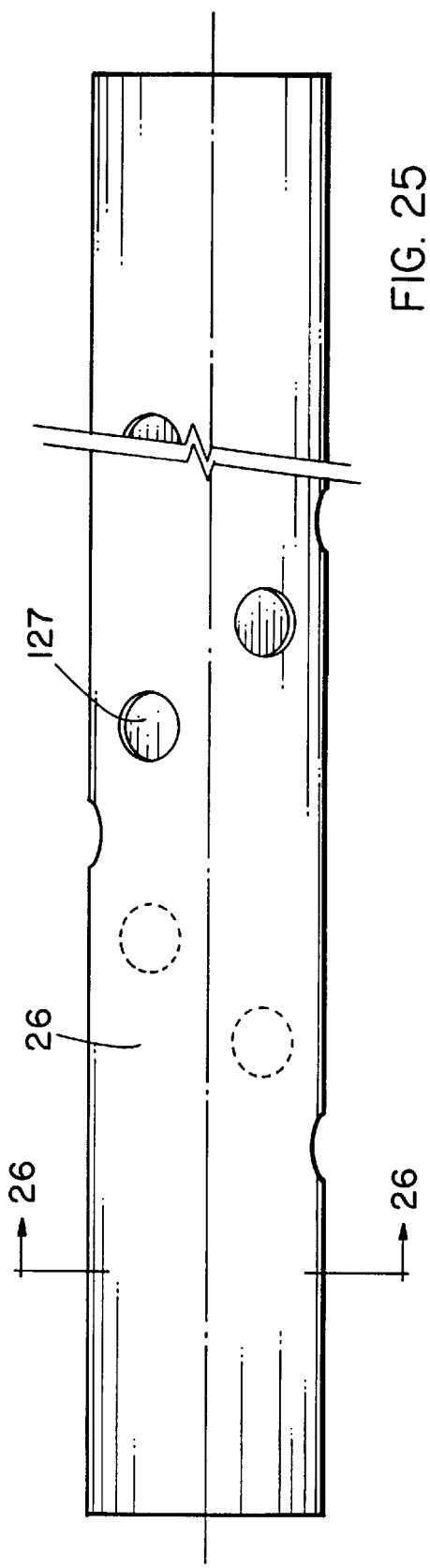
FIG. 25 illustrates scallops machined into the outer curved surface of a pipe.
Figure 27:
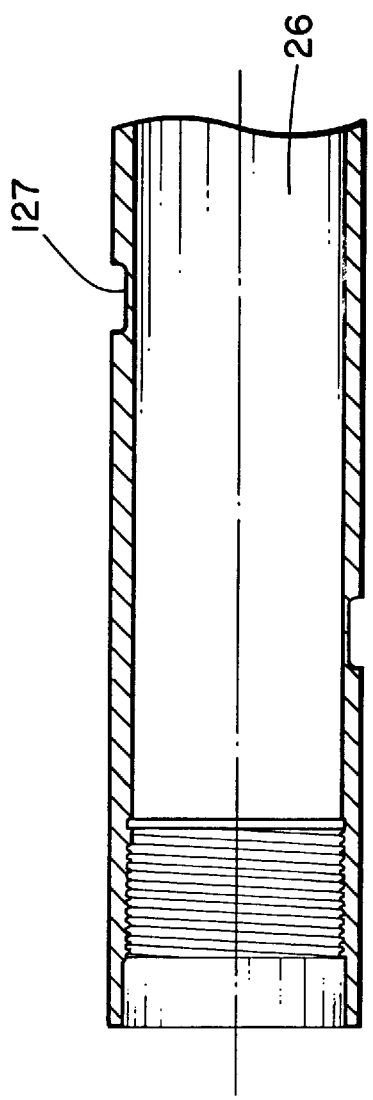
FIG. 27 is a longitudinal sectional view of the end of the finished pipe of FIG. 26.

In an alternative embodiment, the apparatus does not include clamping apparatus 166 for securing the pipe in place while the work table is moved with respect to the pipe. Rather, the pipe is held in position using by a locating tool installed on the driver of the of machining apparatus 156. The locating tool enters the scallop (or hole) farthest downstream in the work area and presses the pipe against the backing units 171 clamping devices 125, 127, 128 are released from the pipe and the table moved in direction of arrow 194b (FIG. 24a). The clamping devices then re-secure the pipe, the locating tool is disengaged from the pipe and returned to the magazine. The work tool is then replaced onto the driver and machining operations on the side of the pipe continued. In the sense that this embodiment requires time for deinstallation of a milling tool (e.g. scalloping tool), installation of the locating tool for the shuttling operation, deinstallation of the locating tool and reinstallation of the milling tool, this embodiment does not have the full time saving advantage of the previously described embodiment involving clamp 166. Further, of course, this embodiment requires a scallop or similar worked area on the side of a pipe for engagement of the pipe by the locating tool.

Appendix B, below, provides exemplary manufacturing times achievable with the invention disclosed herein.

It will be understood that a person skilled in the art would be capable of varying the embodiments described herein while remaining within the scope of this invention. Preferred embodiments having been described, claims which define the desired scope of protection for the invention follow.

APPENDIX A

G-Code for GUN Program

%
02S414
(4" GUN 2 METER 14 SPM)
(PRIME PERF.)
(4" SCALLOPED CARRIER)
(DO NOT CHANGE VARIABLES MARKED THUS)
(DO NOT CHANGE ORDER OF VARIABLE INTRO)
(SET O/D /2) [SV, V37=4.0/2]
(METERS LONG-2)
(FINISHED LENGTH-93.12)
(SCALLOPS PER METER) [SV, V57=14]

APPENDIX A-continued

G-Code for GUN Program (TOTAL SCALLOPS) [SV, V67=27]
(SCALLOP DEPTH -.008) [SV, V42=.242]
(DEGREE OF PHASING-90)
(SCALLOP PITCH) [SV, V52=3.0]
(DEPTH OF BROACH-.375) [SV, V31=3.462)
(THREAD MAJ DIA) [SV, V32=3,437/2]
(BORE DIA/2 MID LIMIT) [SV, V47=3.5/2]
(THREAD MIN DIA/2 TOP LIMIT) [SV, V48=3.279/2]
(.102 GROOVE DIA FOR) [SV, V36=3.56/2]
(DEPTH OF .102 GROOVE) [SV, V50=3.40]
(START POINT OF FIRST SCALLOP IN POS.) [SV, V38=7.56]
(*DEPTH OF THREAD CALC.) [SV, V33=V50−.135]
(*START POINT OF SECOND THREAD PASS) [SV, V35=[V33−.1667]]
(*LOOP COUNT TO SKIP FIRST SCALLOP) [SV, V39=0]
(*W AXIS EXTENSION T1)
[IF, V37<2.125/2, GO, 2]
[IF V37<3.4/2 GO, 3]
[IF V37<4.125/2, GO, 4]
[IF V37<5.1255/2, GO, 5]
[IF V37<6.125/2, GO, 6]
N2[SV, V40=14.1875] [GO, 7]
N3[SV, V40=13.5] [GO, 7]
N4[SV, V40=12.875] [GO, 7]
N5 [SV, V40=12.375] [GO, 7]
N6 [SV, V40=11.875] [GO, 7]
N7(*W AXIS T9 PLUNGER) [SV, V41=[V40−1.267+V42+.25+.06]]
(*VARIABLE PULL IN SCALLOP END) [SV, V44=V38]
(*LAST PULL ABS. POS. CALCULATION)
(*ROTARY TABLE PUSH ERROR, SET TO JAW ERROR)
[IF, V37<3.4/2, GO, 9]
[IF, V37<4.125/2, GO, 10]
[IF, V37<5.1255/2, GO, 11]
[IF, V37<6.125/2, GO, 12]
N9[SV, V46=.0035] [SV, V64=.006] [SV, V60=17]
[SV, V62=1.] [SV, V63=1] [SV, V70=12]
[GO, 13]
N10[SV, V46=.004] [SV, V64=−.306] [SV, V60=18]
[SV,V62=1.] [SV, V63=.9] [SV, V70=13] [SV, V72=4.845]
[GO, 13]
N11[SV, V46=.003] [SV, V64=−.871] [SV, V60=19]
[SV, V62=1.58] [SV, V63=.8] [SV, V70=14]
[G0, 13]
N12[SV, V46=.006] [SV, V64=[SV, V60=20]
SV, V62=1.] [SV, V63=.7]
[GO, 13]
N13
(RADIAL PLUS FACTOR IN THREAD) [SV, V49=.02]
[IF, V57=14, GO, 14]
[IF, V57=17, GO 15]
[IF, V57=20, GO, 16]
[IF, V57=26, GO, 17]
N14[SV, V56=6] [SV, V66=7]
[SV, V58=12] [GO, 18]
N15[SV, V56=7] [SV, V66=8]
[SV, V58=14.4] [GO, 18]
N16[SV, V56=9] [SV, V66=10]
[SV, V58=12] [G0, 18]
N17[SV, V56=12] [SV, V66=13]
[SV, V58=12] [GO, 18]
N18
(V67 IS NUM OF SCAL)
[SV, V81=V67−V66]
(V81 IS NUM OF SCAL AFTER 1ST PULL)
[SV, V82=V8 1/[V66−1]]
(V66-1 IS NUMBER OF SCALS IN FULL CYCLES OTHER THAN FIRST CYCLE)
(V82 IS NUM FULL CYCLES IN V81)
[SV, V55=FOMT[V82]]
(ABOVE LINE REMOVES DECIMAL PORTION OF V82)
[SV, V84=V82−V55]
(V84 IS FRACTION OF FULL CYCLE LEFT)
[SV, V85=[V66−1]*V84]
(V85 IS SCAL LEFT TO DO)
[SV, V51=FRND[V85]]
(VS1 NEEDS TO BE AN INTEGER)
(SV, V53=V56*V52)

APPENDIX A-continued

G-Code for GUN Program

[SV, V45=54.532–[V38+V56*V52]–[V38+V58] + [V38+V53–V581]]
[IF, V52*V56+V38>25.6, GO, 9999]
[IF, V38<7, GO, 9999]
[IF, V37<1.65, GO, 9999]
G72$MAINNEW
N9999
M30
%
OMAINEW
(MAIN PROG. FOR 3+4" GUNS)
G25
G73Z45.25
G 53
[IF, V57=26, GO, 2]
[IF, V57=39, GO, 2]
N1G57H901
[GO, 3]
N2G57H909
N3G0G90X.440
M96
M97
M00 (LOAD PIPE)
(LOWER LIFTING ROLLERS)
T[V60]
N1(6"STOP)
G43H20
GOX.440Y0
Z1.M19
Z.06
M00 (PUSH PIPE UP TO STOP)
M90 (LOCK ENDS)
M94 (CLAMP CHUCK)
M00 (MAKE SURE LIFTING ROLLERS ARE DOWN)
(START)
Z2.
M06
[IF, V57=26, GO, 4]
[IF, V57=39, GO, 4]
[SV, V61=901] [SV, V65=1]
[SV, V71=0]
[IF, V37=5.0/2, GO, 5]
G72$ENDNEW
[GO, 6]
N4[SV, V61=909] [SV, V65=1]
[SV, V71=0]
N5G72$ENDST
N6
M51
M93
M00(SCREW MANDREL INTO END OF GUN)
[IF, V57=26, GO, 8]
[IF, V57=39, GO, 8]
N7GS7H902
[GO, 9]
N8G57H910
N9GOX-25.
G91B-90
T[V60]
G90
G24X39.506Y31.545Z45.75119.677J–.01K17.675
(TABLE AT ZERO)
G72$SCALLOP, L[V55]
(V44=ABS.PULL POS. FOR LAST SCALLOPS)
[SV, V44=V38+V53–[51*V52]]
G72$SCALLOP, L1
[IF V84=0, GO, 49]
(SCALLOP FINISH)
[IF V57=26, GO, 11]
[IF V57=39, GO, 11]
N10G58W–[V40]H902
G58Z[V37–.025]H902
G57H902
[GO, 12]
N11G58W–[V40]H910
G58Z[V37–.025]H910
G57H910
N12G90

ME
G43H1
Z.25W–[V40]Y0
M8
[IF, V66=4, GO, 13]
[ff, V66=7, GO, 14]
[IF, V66=8, GO, 15]
[IF, V66=10, GO, 16]
[IF, V66=13, GO, 17]
[IF, V66=15, GO, 18]
[IF, V66=19, GO, 19]
GO, 20]
N13G72$4SCAL
[GO, 20]
N14G72$7SCAL
[GO, 20]
N15G72$8SSCAL
[GO, 20]
N16G72$10SCAL
[GO, 20]
N17G72$13SCAL
[GO, 20]
N18G72$15SCAL
[GO, 20]
N19G72$19SCAL
N20
M01
N49
N99
M9
(PULL BACK TO MACHINE LAST END)
[IF, V57=26, GO, 22]
[IF, V57=39, GO, 22]
N21G57H902
[GO, 23]
N22G57H910
N23G010
G73W0
M5
M00
G0X–[V38+V53–V58]
G73Z22.62
M92
M95 (OPEN CHUCK)
G1X–[V38+V53+V46]F100.
M94
M93
G04P2
[IF, V67=17,GO, 220]
X–[V3 8+V53–V58]
[GO, 221]
N220X–[V3 8+V53–V58+2.4]
N221M92
M95
[IF, V67=17, GO, 300]
G1X–[V45+V46]F100.
[GO, 301]
N300G1X–[V45+V46+2.4]F100.
N301M94
M93 OPBN GRIPPER
G04P2. DWELL
M06 TOOL CHANGE
X–25.
G0G90B-270
M92
M90(LOCK ENDS)
[IF, V57=26, GO, 25]
[IF, V57=39, GO, 25]
N24[SV, V61=903]
[GO, 26]
N25[SV, V61=911]
N26
[SV, V65=20]
G25
[IF, V57=26, GO, 28]
[IF, V57=39, GO, 28]
[IF, V37=5.0/2, GO, 28]

APPENDIX A-continued

G-Code for GUN Program

```
N27G72$ENDNEW
[GO, 29]
N28072$ENDST
N29M00
G57H901
G0G90X.44
M95
M51 (UNLOCK)
M00 (UNLOAD)
M00 (LAST CALL TO UNLOAD)
G0090B90
M30
%
```

APPENDIX B

Examples of total carrier manufacturing times.

| Carrier Diameter | Shot per Meter | Carrier Length | Number of Scallops | Manufacturing time |
|---|---|---|---|---|
| 3 3/8" | 14 (4 spf) | 1 m | 14 | 24.7 minutes |
|  |  | 3 m | 40 | 33.4 |
| 3 3/8" | 20 (6 spf) | 2 m | 40 | 32.1 |
|  |  | 4 m | 80 | 39.2 |
| 4.0" | 14 | 1.5 m | 21 | 32.1 |
|  |  | 3 m | 40 | 39.3 |
|  |  | 6 m | 80 | 55.1 |
|  | 17 (5 spf) | 1 m | 17 | 29.9 |
|  |  | 3 m | 50 | 39.4 |
|  |  | 6 m | 100 | 57.4 |
|  | 20 (6 spf) | 1 m | 20 | 30.2 |
|  |  | 3 m | 60 | 39.3 |
|  |  | 6 m | 120 | 56.9 |
|  | 30 (9 spf) | 1 m | 31 | 32.4 |
|  |  | 3 m | 90 | 45.6 |
|  |  | 4 m | 120 | 52.1 |
| 5.0" | 14 | 1 m | 14 | 34.0 |
|  |  | 3 m | 40 | 34.0 |
|  |  | 6 m | 80 | 59.1 |
|  | 17 | 1 m | 17 | 34.0 |
|  |  | 3 m | 50 | 43.8 |
|  |  | 6 m | 100 | 61.2 |
|  | 26 (8 spf) | 2 m | 54 | 41.8 |
|  |  | 3 m | 81 | 48.5 |
|  |  | 5 m | 133 | 60.9 |
|  | 39 (12 spf) | 2 m | 79 | 46.3 |
|  |  | 3 m | 118 | 52.8 |
|  |  | 6 m | 196 | 68.0 |

What is claimed is:

1. An apparatus for manufacturing a machined article from a tubular stock piece having a longitudinal axis, the apparatus comprising:

a machining device movable within a work area of the apparatus;

a movable base having first and second spaced apart clamps, mounted to the base, for securing the piece in a first clamped position in which a first section of the piece is located between the clamps; and a stationary third clamp mounted independent of the base, located to clamp onto the piece when the piece is secured in a said first clamped position, for holding the piece in a stationary position with respect to the base, to permit unclamping of the first and second clamps from the piece and movement of the base, to reposition the piece with respect to the first and second clamps, and securing of the piece by the first and second clamps in a second clamped position in which a second section of the piece is located between the first and second clamps; and wherein, the base is movable to permit positioning of the first and second sections of the piece in the work area, when clamped in the first and second clamped positions, respectively, for machining thereof by the machining device;

the first and second clamps are oriented and the third clamp is located to permit mutual alignment of the first, second and third clamps when the piece is secured in the stationary position by the first, second and third clamps;

the base is rotatable about a generally upright axis and the first and second clamps are located such that, when the piece is in a said clamped position, the axis of the piece forms an angle of about 90° with the upright axis; and the apparatus further comprises a conveyor for the piece;

the conveyor has a first position which permits conveying of the piece in a direction parallel with the axis of the piece for receipt within the first and second clamps, when each of the first and second clamps is in an open position, in a first working position coincident with a said clamped position in which a leading first end of the piece is located in the work area of the apparatus for machining by the machining device; and the conveyor has a second position to provide clearance for movement of the piece past the conveyor when the piece is secured in a said clamped position and the base is rotated about the upright axis.

2. An apparatus for manufacturing a machined article from a tubular stock piece having a longitudinal axis, the apparatus comprising:

a machining device movable within a work area of the apparatus;

a movable base having first and second spaced apart clamps, mounted to the base, for securing the piece in a first clamped position in which a first section of the piece is located between the clamps;

a stationary third clamp mounted independent of the base, located to clamp onto the piece when the piece is secured in a said first clamped position, for holding the piece in a stationary position with respect to the base, to permit unclamping of the first and second clamps from the piece and movement of the base, to reposition the piece with respect to the first and second clamps, and securing of the piece by the first and second clamps in a second clamped position in which a second section of the piece is located between the first and second clamps; wherein, the base is movable to permit positioning of the first and second sections of the piece in the work area, when clamped in the first and second clamped positions, respectively, for machining thereof by the machining device; and the base is rotatable about a generally upright axis and the first and second clamps are located such that, when the piece is in a said clamped position, the axis of the piece forms an angle of about 90° with the upright axis; and a conveyor for the piece; wherein, the conveyor has a first position which permits conveying of the piece in a direction parallel with the axis of the piece for receipt within the first and second clamps, when each of the first and second clamps is in an open position, in a first working position coincident with a said clamped position in which a leading first end of the piece is located in the work area of the apparatus for machining by the machining device.

3. The apparatus of claim 2, wherein the conveyor is movable between said first position and a second position in which clearance is provided for movement of the piece past the conveyor when the piece is secured in a said clamped position and the base is rotated about the upright axis.

4. The apparatus of claim 1 wherein the machining device includes a rotatable spindle for mounting of machining tools thereon, the spindle being rotatable about a generally horizontal spindle axis, and the conveyor, when in the first position, is located to orient the longitudinal axis of the piece so as to be parallel with the spindle axis.

5. The apparatus of claim 4, wherein:

the base is rotatable about the upright axis by about 90° so as to move the piece from the first working position to a second working position in which a said section of the piece is in the working area; and the third clamp is in a location remote from between the first and second clamps and the first, second and third clamps are in said mutually aligned arrangement, to permit step by step said repositioning of the piece from the second working position into a third working position in which a second end of the piece is, after rotation by the base by a further 90°, located in the work area.

6. The apparatus of claim 3 wherein the machining device includes a rotatable spindle for mounting of machining tools thereon, the spindle being rotatable about a generally horizontal spindle axis, and the conveyor, when in the first position, is located to orient the longitudinal axis of the piece so as to be parallel with the spindle axis.

7. The apparatus of claim 6, wherein:

the base is rotatable about the upright axis by about 90° so as to move the piece from the first working position to a second working position in which a said section of the piece is in the working area; and the third clamp is in a location remote from between the first and second clamps and the first, second and third clamps are in said mutually aligned arrangement, to permit step by step said repositioning of the piece from the second working position into a third working position in which a second end of the piece is, after rotation by the base by a further 90°, located in the work area.

* * * * *